United States Patent
Reershemius et al.

(10) Patent No.: US 10,934,024 B2
(45) Date of Patent: Mar. 2, 2021

(54) METHOD FOR PACKING AND UNPACKING A SPACECRAFT MEMBRANE, SPACECRAFT MEMBRANE PACKAGE AND SPACECRAFT MEMBRANE HANDLING UNIT

(71) Applicant: Deutsches Zentrum fuer Luft- und Raumfahrt e.V., Cologne (DE)

(72) Inventors: Siebo Reershemius, Bakum (DE); Peter Spietz, Bremen (DE)

(73) Assignee: DEUTSCHES ZENTRUM FUER LUFT-UND RAUMFAHRT E.V, Cologne (DE)

( * ) Notice: Subject to any disclaimer, the term of this patent is extended or adjusted under 35 U.S.C. 154(b) by 510 days.

(21) Appl. No.: 15/876,646

(22) Filed: Jan. 22, 2018

(65) Prior Publication Data
US 2018/0208332 A1    Jul. 26, 2018

(30) Foreign Application Priority Data
Jan. 23, 2017   (DE) ................... 10 2017 101 180.3

(51) Int. Cl.
*B64G 1/22*      (2006.01)
*B64G 1/40*      (2006.01)
*B65H 45/101*    (2006.01)

(52) U.S. Cl.
CPC ............ *B64G 1/222* (2013.01); *B64G 1/407* (2013.01); *B65H 45/101* (2013.01); *B64G 2700/66* (2013.01); *B65H 2301/4216* (2013.01)

(58) Field of Classification Search
CPC ....... B64G 1/222; B64G 1/407; B65H 45/101
See application file for complete search history.

(56) References Cited

U.S. PATENT DOCUMENTS 6,568,640 B1 *   5/2003   Barnett ................ B64G 1/222
                                                       244/158.3
6,585,193 B1 *   7/2003   Kustas ................. B64G 1/222
                                                       244/169
(Continued)

FOREIGN PATENT DOCUMENTS

DE         102 41 618 B4       10/2005
DE            10241618    *    10/2005
DE       10 2010 048 054 A1     4/2012

OTHER PUBLICATIONS

"Design and Sizing Method for Deployable Space Antennas" (M. Straubel; dissertation, Otto-von-Guericke-Universität Magdeburg, 2012).

(Continued)

*Primary Examiner* — Justin M Benedik
(74) *Attorney, Agent, or Firm* — Thomas | Horstemeyer, LLP

(57) ABSTRACT

In a method for packing a spacecraft membrane (1) which in a plane of extension comprises a longitudinal axis between opposite longitudinal corners (4) and a transverse axis running transverse to the longitudinal axis and through transverse corners into a spacecraft membrane package, two packing steps are executed: In a first packing step, the spacecraft membrane (1) is packed into a transverse package (9) along the transverse axis. In a second packing step, the transverse package (9) is packed into a longitudinal package along a longitudinal axis. The packing of the spacecraft membrane (1) in the first packing step comprises a packing of material of the spacecraft membrane (1) from or on both sides of the longitudinal axis. In the first packing step, the spacecraft membrane (1) is packed in such a way that in the created transverse package (9) the transverse corners are freely accessible. In the second packing step, the transverse package (9) is packed in such a way that in the created (Continued)

longitudinal package the longitudinal corners (4) are freely accessible. The longitudinal package is unpacked by pulling on the longitudinal corners (4). Subsequently, the transverse package (9) is unpacked by pulling on the transverse corners.

17 Claims, 23 Drawing Sheets

(56) References Cited

U.S. PATENT DOCUMENTS

| | | | |
|---|---|---|---|
| 9,550,584 B1* | 1/2017 | Harvey | B64G 1/222 |
| 2016/0304220 A1* | 10/2016 | Cecchini | B64G 1/407 |
| 2016/0376037 A1 | 12/2016 | Pellegrino et al. | |

OTHER PUBLICATIONS http://global.jaxa.jp/projects/sat/ikaros, May 29. 2015, copy downloaded Jan. 22, 2018.
https://www.nasa.gov.mission_pages/smallsats/nanosaild.html, Nov. 29, 2011, copy downloaded Jan. 22, 2018.

* cited by examiner

METHOD FOR PACKING AND UNPACKING A SPACECRAFT MEMBRANE, SPACECRAFT MEMBRANE PACKAGE AND SPACECRAFT MEMBRANE HANDLING UNIT

CROSS REFERENCE TO RELATED APPLICATIONS

This application claims priority to co-pending German patent application No. DE 10 2017 101 180.3 entitled "Verfahren zum Packen einer Raumfahrzeugmembran, Raumfahrzeugmembran-packung and Raumfahrzeugmembran-Handhabungseinheit", filed Jan. 23, 2017.

FIELD OF THE INVENTION

The invention relates to a method for packing and unpacking a spacecraft membrane into a spacecraft membrane package and to a spacecraft membrane handling unit.

On spacecrafts, spacecraft membranes are employed in different functions. For example, spacecraft membranes are employed as solar sails, as antennas, as so-called "drag sails" or as large support structure for photovoltaic cells, where in one spacecraft membrane the mentioned functions may be combined. The spacecraft membrane is usually packed compactly into a spacecraft membrane package, where the packing may be a folding or winding or a combination of those. The resulting spacecraft membrane package then is space-savingly stowed on the spacecraft. Only when the spacecraft has reached space, the spacecraft membrane package is unpacked.

BACKGROUND OF THE INVENTION

For packing spacecraft membranes, there are several known techniques which have in common that the spacecraft membrane package is to be as compact as possible and that the unpacking has to be able to be done completely automatically, so that the unpacking may be done on the spacecraft in space without human intervention.

Spacecraft membranes in their state ready to be employed are frequently rectangular, especially square.

The scientific paper "Design and Sizing Method for Deployable Space Antennas" (M. Straubel; dissertation, Otto-von-Guericke-Universitat Magdeburg, 2012) discloses a method for packing a membrane antenna. The membrane antenna is rectangular and comprises coilable masts along its long sides. Starting on its short sides, the membrane antenna with its masts is wound onto spool bodies. Analogously, the membrane antenna may only be wound onto a spool body starting from one of its short sides. The width of the membrane antenna is directly limited by the length of the spool body or the spool bodies and therefore by a stowing length available on the spacecraft. For a wider membrane, a wider spool body is needed, where a mass of the spool body increases with its width. Wider membranes therefore do not only put a load onto the spacecraft with their own increased mass, but additionally increase the mass of the spool body.

In order to avoid limiting the width of the spacecraft membrane by requirements of stowing space, it is known to make especially square spacecraft membranes up from four partial membranes in the shape of right-angled triangles.

The "IKAROS" spacecraft of the Japan Aerospace Exploration Agency (JAXA) comprises four triangular solar sail membranes which join together to form a square (e.g. http://global.jaxa.jp/projects/sat/ikaros [accessed Jan. 23, 2017]). The solar sail membranes comprise tensioning ropes, at the ends of which weights are attached. The solar sail membranes and the tensioning ropes are wound onto a central spool body. The solar sail membranes are unpacked in that by a rotation of the spacecraft the weights and with them the tensioning ropes with the solar sail membranes attached to them are centrifuged outwards. Without masts, only with the tensioning ropes, the stretched-out solar sail membranes are limp. Therefore, the solar sail membranes only remain tensioned as long as the spacecraft rotates. The weights necessary for unpacking and keeping up the tension are on the outer ends of the tensioning ropes in the unpacked state. Vibrations created during unpacking can only decay very slowly due to the small dampening, so that the solar sail membranes may possibly oscillate several days or even weeks after unpacking, due to which the solar sail membranes during this time may possibly not be used. It would be problematic to operate a corresponding spacecraft membrane as a photovoltaic membrane, since photovoltaic membranes have to be aligned to the sun quickly. Quick alignment, however, is only possible with an unjustifiably high effort of energy for the solar sail membrane as IKAROS has it: Due to the rotation necessary for tensioning the spacecraft membrane and the gyroscopic forces occurring due to this, the spacecraft can only be realigned with a high effort of energy.

The spacecraft "NanoSail-D2" of the National Aeronautics and Space Administration (NASA) also comprises four triangular solar sail membranes which join together to form a square (e.g. https://www.nasa.gov/mission_pages/smallsats/nanosaild.html [accessed Jan. 23, 2017]). The solar sail membranes comprise coilable metallic masts which extend from the center of the square along its diagonals. The solar sail membranes and the masts are wound onto a central spool body. The solar sail membranes are unpacked in that the wound masts are released and the energy stored in the masts due to the winding is released.

For the "Gossamer" project of the Deutsches Zentrum für Luft- and Raumfahrt (DLR), four triangular solar sail membranes are joined into a square. Each solar sail membrane is folded in the zigzag pattern and wound onto one spool body each from both ends so that each solar sail membrane may be unwound starting from its center by uncoiling of masts into both directions and unpacked in this way (see e.g. http://www.dlr.de/irs/en/DesktopDefault.aspx/tabid-6931/ 11365_read-26354/gallery-1/gallery_read-Image.46.16877/ [accessed Jan. 23, 2017]). The packing, therefore, necessitates eight spool bodies overall. These remain on the outer ends of the masts and in this way especially during manoeuvers of the spacecraft put a load on the masts so that these masts have to be designed to be robust and therefore more massive than would be the case if they only had to carry the solar sail membranes. It is also known to jettison the spool bodies after unpacking. Jettisoning, however, creates unnecessary space debris and therefore contravenes national and international codes of conduct of space agencies for avoiding space debris.

Also from document DE 10 2010 048 054 A1, a method for unpacking a film is known which comprises four triangular film parts joining together to form a square. The film parts are wound in the same direction starting from their hypotenuse and parallel to it into several windings and subsequently folded into a zigzag folding so that an elongated film package results. Subsequently, the film package is folded once in the middle so that both its ends come to rest lying on one another and a central fold results. Starting from the central fold, the film package is wound onto a spool body. The packing therefore necessitates four spool bodies overall. Unpacking is achieved by extendable masts being fixed to the ends of the film package and the film membrane being unwound from the spool body by extending the masts and subsequently unfolded.

Document US 2016/0304220 A1 discloses a square spacecraft membrane, which can be packed in one piece. Along its diagonals it comprises inflatable tubes, which can be pressurized with a gas via a common valve positioned at their intersection. The spacecraft membrane is sequentially folded on both sides of one diagonal, the longitudinal axis, in a zigzag folding parallel to the longitudinal axis. Each zigzag folding is made so that it extends over the longitudinal axis to the other side. One zigzag folding therefore comes to rest on the other zigzag folding in a partially overlapping way. Subsequently, the longitudinal package formed in this way is folded in the direction of the center, marked by the other diagonal, the transverse axis, in a zigzag shape from both sides and a transverse package formed in this way, where either one side is folded in a zigzag-shaped way first and then the other side (so that the resulting second zigzag folding comes to rest on the first one) or both sides are folded in a zigzag-shaped way together (so that the two resulting zigzag foldings intersect). For unpacking, the tubes are pressurized with the gas via the valve. Because there is only the one valve, the gas enters into both tubes with the same pressure, so that transverse package and longitudinal package are unpacked at the same time. The unpacking therefore is uncontrolled and "messy" in that the spacecraft membrane goes through unpredictable unpacking states, in which the longitudinal package and the transverse package are partially unpacked.

Document DE 102 41 618 A1 discloses a method for packing and unpacking a film which comprises four triangular film parts joining together to form a square. The film parts are wound freely or onto a core that is subsequently removed, so that an elongated film package results. Subsequently, the film package is wound onto a fork that is subsequently removed, starting from the center, so that a film coil results which is then stowed away in a stowing container. Onto each film coil, strings are affixed to the corners bordering the hypotenuse. These strings are guided along four uncoilable masts perpendicular with respect to one another in a plane, so that after uncoiling the masts the film coils can be pulled out of the stowing containers and unwound by pulling on the strings along the masts from the outside in, so that the elongated film packages are tensioned between the outer ends of the masts (along the sides of the square to be covered by the film). Onto the corners lying between the catheti of the film parts, further strings are affixed which subsequently are also (directly) pulled in the direction of the center so that the elongated film coils are unpacked. The film parts then are tensioned on the strings between the masts. The fate of the stowing containers is not disclosed in DE 102 41 618 A1. It can, however, be assumed that they are jettisoned and therefore become space debris.

SUMMARY OF THE INVENTION

It is the object of the invention to propose a method for packing and unpacking a spacecraft membrane and a spacecraft membrane handling unit which enable an improved unpacking and an improved operation of the spacecraft membrane.

The invention is in particular based on the observation that spacecraft membranes in which the rectangular, especially square, shape is made up of several segments, especially right-angled triangle segments, have the disadvantage that the segments are usually only fixed on their corners and not joined to one another. For example, the triangular segments are not joined to one another along the diagonals of the square. Due to this, e.g. the distribution of the applied tensile stress is worse, creases may form more easily and/or the usable surface is decreased.

The invention relates to a method for packing a spacecraft membrane which in a plane of extension comprises a longitudinal axis between opposite longitudinal corners and a transverse axis running transverse to the longitudinal axis and through opposite transverse corners into a spacecraft membrane package. In a first packing step, the spacecraft membrane is packed into a transverse package along a transverse axis, and in a second packing step, the transverse package is packed into a longitudinal package along the longitudinal axis. In the first packing step, the spacecraft membrane is packed in such a way that in the created transverse package the transverse corners are freely accessible. The packing in the first packing step comprises a packing of material of the spacecraft membrane from and/or on both sides of the longitudinal axis. In the second packing step, the transverse package is packed in such a way that in the created longitudinal package the longitudinal corners are freely accessible. In this way, the longitudinal package can be unpacked by pulling on the longitudinal corners and subsequently the transverse package can be unpacked by pulling on the transverse corners.

The invention also relates to a spacecraft membrane handling unit with a spacecraft membrane package with a spacecraft membrane which in a plane of extension comprises a longitudinal axis between opposite longitudinal corners and a transverse axis running transverse to the longitudinal axis and through opposite transverse corners and which along the transverse axis has been packed into a transverse package and along the longitudinal axis has been packed into a longitudinal package. The packing of the spacecraft membrane comprises a packing of material of the spacecraft membrane from and/or on both sides of the longitudinal axis. In the created transverse package, the transverse corners are freely accessible. In the created longitudinal package, the longitudinal corners are freely accessible. In this way, the longitudinal package can be unpacked by pulling on the longitudinal corners and subsequently the transverse package can be unpacked by pulling on the transverse corners.

The longitudinal package therefore is superimposed on the transverse package. That in the created longitudinal package the opposite longitudinal corners are freely accessible does not mean that in the longitudinal package the transverse corners also have to be freely accessible. It is possible that the transverse corners are only freely accessible when the longitudinal package has been unpacked. If, for example, an unpacking mechanism is provided with which the spacecraft membrane is to be unpacked, this unpacking mechanism may be directly connected to the longitudinal corners but only indirectly connected to the transverse corners. The indirect connection may for example be achieved by use of strings which may also be packed into the longitudinal package.

The longitudinal corners and/or transverse corners of the spacecraft membrane are fixed to extendable masts, in particular to ends of the masts that in extending the masts are brought away from a starting position where the spacecraft membrane package and the masts are arranged in a packed/retracted state, so that the pulling force onto the longitudinal corners and/or transverse corners can be exerted by extending the masts. In this way, with the spacecraft membrane package and the masts a spacecraft membrane handling unit may be formed.

For example, in the direction of the longitudinal axis one or two longitudinal masts and in the direction of the transverse axis one or two transverse masts may be employed. For one embodiment, the masts are separate structures from the spacecraft membrane and may be comprised of or comprise material different from a material or materials of the spacecraft membrane. The masts may be inherently rigid and self-supporting. They may comprise any material that is stiff enough to support itself, such as metal, especially aluminum, fiberglass or plastic, especially carbon-fiber reinforced plastic. Light-weight (i. e. low volumetric density) materials are preferred. The masts may be composed of different materials, especially where different materials add different functionalities, such as a flexible material for sections that need to bend e. g. for the masts to be stowed away and a rigid material for sections that provide stability. The masts may e. g. be full-bodied or hollow or they may comprise a lattice-like structure. They may also be comprised of or comprise rigid and unbendable elements. Together with such rigid elements, they may comprise elements that in themselves are not rigid, such as wires. Especially, a rigidity of elements of the masts may be inherent in the elements and unchanged between a stowed state and an extended or deployed state (including any intermediate state). That the masts are extendable may e. g. mean that the masts can be uncoiled, unfolded or telescoped. Each mast in its entirety may be stowed in a central or starting configuration, where it may optionally be contained in a mast container. The mast may comprise identical or dissimilar elements or segments, which may be nested, stacked, coiled, folded, collapsed or in another way compacted. The mast may be extended in that nesting segments of the mast are moved outwards (telescoped) or that segments of the mast are brought from a collapsed or folded state into an extended or unfolded state. It may also be extended in that it is straightened (uncoiled) from the stowed configuration. Preferably, the extension of the masts acts along only one degree of freedom. The extension of the masts may comprise an extension only in a direction outwards from the central or starting configuration but not transverse to it, i. e. the masts may only grow in length (or, e. g. in the case of uncoiling masts, in extending length), but not in thickness or in a lateral direction. That is, the later thickness of the mast is present in the stowed segments, e. g. those that are nested, stacked, coiled or folded or collapsed in a dimension other than thickness, typically a length dimension. In any case, the masts comprise a mechanism that enables increasing the distance of one end of the mast from the other end of the mast so that the masts can be brought from a stowed, compact state with a small longitudinal extension into an operating state for the spacecraft membrane with a large longitudinal extension. In this operating state and in any intermediate state between the stowed state and the operating state the masts may be self-supporting, that is, they may hold their extended configuration and/or their shape permanently without any external support, pressurization, guying or similar measures, especially without the need of constantly applied measures such as a constant upkeep of pressurization. (Though the masts may be intentionally collapsible, that is, able to be stowed back into the central or starting configuration.)

In order to extend and, if applicable, collapse or retract the masts, the spacecraft handling unit may comprise an extension unit. The extension unit may be remote to the masts and affixed elsewhere on the spacecraft. It may also be arranged on or in the vicinity of the masts, preferably in or near the starting position, that is, a place where the masts intersect and where they are stowed, i. e. where a mast container may be placed. If there is a mast container, the extension unit may be mounted on or in the mast container. The extension unit may comprise control logic. The extension unit may also comprise control means that do not depend on logic, which might e. g. be mechanical. The extension unit may be configured to extend the masts and it may be able to trigger, control and possibly halt the extension and, if applicable, the collapse or retraction of the masts. It may be able to control a speed of the extension and, if applicable, the collapse or retraction. If there are different stages to the extension (and/or the collapse or retraction) of the masts, the extension unit may trigger the different stages.

Especially if on the longitudinal package all longitudinal and transverse corners of the spacecraft membrane are free, but otherwise also indirectly, the masts may already be fixed to the longitudinal corners and/or transverse corners of the spacecraft membrane or be connected to them even for a stowed state in which the masts are retracted and the spacecraft membrane packed.

The unpacking of the spacecraft membrane therefore may be effected simply by extending the masts. If the corners of the spacecraft membrane are fixed to the masts before extension of the masts begins, the corners are pulled outwards with the mast ends and away from the starting position, gradually unfolding the spacecraft membrane.

The extension unit may control the extension of the masts in such a way that those masts to which the longitudinal corners are affixed, referred to as longitudinal masts, are extended while those masts to which the transverse corners are affixed, referred to as transverse masts, remain in the stowed configuration. In this way, a pulling force is exerted onto the longitudinal corners —and therefore the longitudinal package is unpacked—while the transverse corners remain where they were in the stowed state of the spacecraft membrane and thus the transverse package remains unpacked. Only when the longitudinal package is mostly or preferably fully unpacked, does the control logic trigger the extension of the transverse masts so that the transverse masts pull the transverse corners outwards and thus unpack the transverse package. In this way, the transverse package is only unpacked after the longitudinal package has already been unpacked. The control logic may comprise a switch logic that switches from the extension of the longitudinal masts to the extension of the transverse masts, e. g. by switching a common motor of the masts from one driving state to another or by switching off a motor driving the longitudinal masts and switching on a motor driving the transverse masts.

The spacecraft membrane may be four-sided, for example rectangular or diamond-shaped, especially square, but also trapezoidal. For a four-sided, especially square or diamond-shaped spacecraft membrane, the longitudinal axis is a first diagonal and the transverse axis is a second diagonal. Square and diamond-shaped spacecraft membranes are suitable because they comprise rectangularly arranged and in the case of the square equally long diagonals, which form the longitudinal axis and transverse axis and at the same time are symmetry axes. A size of the spacecraft membrane is not limited by the length of a spool body and therefore ultimately by a practical installation length of the spacecraft membrane package as would be the case for a rectangle wound from one side or two sides. Especially, very large spacecraft membranes may be packed in this way without their edge length being limited by an installation length given by storage space on the spacecraft. The spacecraft membrane also does not have to comprise a straight edge, but the edge may for example be serrated in a regular or irregular way. With a serrated edge, preferably no limp film is employed. Rather than that, in this case the edge may comprise a corresponding stiffness, e.g. because square photovoltaic elements at this place protrude with their corners. A serrated edge may for example also occur if the spacecraft membrane comprises photovoltaic cells arranged in a strip-shaped and offset way so that along the edge something in the way of "steps" forms.

Contrary to the spacecraft membrane packages known from prior art in which it is necessary to assemble large rectangular, especially square, spacecraft membranes modularly from four triangular spacecraft membranes, the spacecraft membrane according to the invention may be unparted. While in the spacecraft membrane packages of prior art the sides, especially the catheti of the right-angled triangles, are not held but only tensioned between fixing points at the corners of the triangles, according to the invention the four-sided spacecraft membrane may be tensioned on its four (longitudinal and transverse) corners and therefore may be tensioned uniformly and overall very effectively, in which way for example the danger of forming creases is decreased. In the known methods for tensioning multiple triangular spacecraft membranes, additionally a multiplicity of spool bodies are frequently used, for example up to eight spool bodies for "Gossamer-1". These on the one hand in an undesired way increase the overall mass of the spacecraft and on the other hand lead to an increased complexity of the unpacking and therefore to an increased susceptibility to faults. Due to the high number of spool bodies alone, devices needed for unpacking are also more complex than necessary according to the invention. Preferably, within the framework of the invention, on the contrary, the use of a spool body for packing the transverse package can be foregone, while for the packing of the longitudinal package a spool body may be used. It is even possible for an embodiment that the longitudinal package, too, is packed without a spool body.

As "packing" the spacecraft membrane here any process is understood with which the spacecraft membrane is brought into a compact shape, for example a folding or winding. A folding can be achieved by winding and subsequent pressing together of an obtained winding. The packing may also comprise multiple steps, for example, the spacecraft membrane may first be folded and subsequently wound or first be folded into one direction and subsequently folded into another direction.

That the packing of the spacecraft membrane comprises a packing of material of the spacecraft membrane from both sides of the longitudinal axis may mean that the spacecraft membrane is packed into itself on both sides of the longitudinal axis, where both sides of the longitudinal axis are packed independently of each other. This packing with two "partial transverse packages" on both sides of the longitudinal axis can be done simultaneously or subsequently. Such a packing may be done symmetrically, in a square or diamond-shaped spacecraft membrane especially mirror-symmetrically but also point-symmetrically, for example in a generally rectangular spacecraft membrane. The packing, however, may also be done unsymmetrically, for example by a zigzag folding on both sides of the longitudinal axis, where the zigzag folding may, however, comprise different widths of the folding, that is, distances between its folding edges. The partial transverse packages may, but do not have to, neighbor each other along the longitudinal axis or parts of the longitudinal axis. The spacecraft membrane may also be packed into itself in such a way that material from both sides of the longitudinal axis is packed overlappingly or intersectingly. For example, the spacecraft membrane may be folded along the longitudinal axis and subsequently folded into a zigzag folding or it may be wound up.

The packing in the first packing step as well as in the second packing step may be done from the inside out or from the outside in. This may only be a different way of doing things, for example in the case of a zigzag folding which has an identical appearance independently of from which direction it has been folded. The result, however, may also be different, for example in a winding of the spacecraft membrane in which the circumstance where the winding of the spacecraft membrane was begun determines which part of the spacecraft membrane in the resulting wound package lies on the inside and which lies in the outside. A winding may comprise a free winding as well as a winding onto a spool body, where the spool body may remain in the wound package or be removed from it. In a folding in which not as in a zigzag folding a folding direction is interchanged but in which the folding is always in one direction (the result corresponds to the "winding and pressing together" described above), the circumstance where the winding of the spacecraft membrane was started determines which part of the spacecraft membrane lies on the inside and which lies on the outside.

The longitudinal package may be unpacked by pulling on the longitudinal corners without the spacecraft membrane having to be fixed in any other way. The spacecraft membrane then after the unpacking is only held on its longitudinal and transverse corners. It is also possible, however, for the spacecraft membrane to be spatially fixed. In order to achieve this, the spacecraft membrane itself (for example in a central portion or an edge portion and/or on the spacecraft) may be fixed. The spacecraft membrane, however, may also be fixed to a spool body around which it is wound, where the spool body in turn may be rotatably supported on the spacecraft so that after unpacking the spacecraft membrane is indirectly fixed to the spacecraft via the spool body. The spacecraft membrane may also be releasably fixed to the spool body, for example by hook-and-loop fastener.

The longitudinal package may be or may have been formed by folding on both sides of the transverse axis. The foldings for example may be zigzag foldings. The folding surfaces may be arranged substantially rectangular to the plane of extension, so that the mirror-symmetric folds result in a kind of "accordion effect". By pulling on the longitudinal corners, the mirror-symmetric foldings are then unfolded, that is, for example the zigzag foldings pulled apart. A corresponding embodiment may especially be chosen for a square or diamond-shaped spacecraft membrane. It is, however, also applicable to other mirror-symmetric spacecraft membrane geometries.

The foldings may be or have been folded each from the longitudinal corner up to a bridge part of the spacecraft membrane package that has not been folded. The spacecraft membrane package then centrally along its longitudinal axis comprises the bridge part in which the spacecraft membrane in the longitudinal package has not been packed. This is especially advantageous if single components are intended to be fed from one side of the spacecraft membrane through the plane of extension of the spacecraft membrane to the other side of the spacecraft membrane. These may be a mast, but also for example cables, cable bushings, tensioning ropes, antennas, or any other component of a spacecraft. These may be fed through the bridge part in that a recess has been made in the bridge part through which the component has been inserted. The recess may only be provided in a lowest layer of the spacecraft membrane while the component fed through is guided past the further layers. The recesses may, however, also be present in all layers, so that possibly the spacecraft membrane in its unpacked state comprises the recesses in regular or irregular distances.

Feeding a component through the spacecraft membrane is also possible without the bridge part.

The longitudinal package may also be or have been formed with a central (especially single) folding of the transverse package when viewed along the longitudinal axis and a subsequent winding. The same effect of the central folding is achieved if the transverse package is centrally fixed on the spool body when viewed along the longitudinal axis and in this way is wound onto the spool body by rotating the spool body. Due to the central folding of the transverse package, the transverse package in the folded state comprises an end at which the two longitudinal corners of the spacecraft membrane are located and a second end on which the folding edge created by the central folding is located. Starting on the folding edge, the transverse package then is freely wound or wound onto a spool body. In this way, the longitudinal corners come to rest on the outside on the winding formed and in the wound package the transverse package lies continuously doubled up. Therefore, the opposite longitudinal corners are free and the longitudinal package may be unpacked according to the invention.

If for the winding a spool body is employed, it is advantageous that the entire spacecraft membrane may be wound unto a spool body. Compared to the up to eight spool bodies of the prior art, this is a considerable saving of mass to be transported for the spacecraft and means a considerable reduction of complexity of the device. Furthermore, the one spool body remains in the centre of the spacecraft membrane after the unwinding or after the complete unpacking. This possibly means an advantageous distribution of masses on the spacecraft membrane and therefore on the spacecraft in its entirety, since corners and edges of the spacecraft membrane are not put under a load by masses of spool bodies.

The packing of the spacecraft membrane in the first packing step on both sides of the longitudinal axis may be done symmetrically. Especially for typical square spacecraft membranes, this may for example be a mirror-symmetric packing. The packing, however, may for example be point-symmetric, for example in a general rectangle which with respect to its diagonals, which serve as longitudinal and transverse axes, is already point-symmetric in itself but not mirror-symmetric.

The transverse package may comprise zigzag foldings on both sides of the longitudinal axis. The zigzag foldings may be oriented with their layers substantially parallel to the plane of extension of the spacecraft membrane. The zigzag foldings may for example be formed in such a way that on each side of the longitudinal axis, that is, for a square or diamond-shaped spacecraft membrane a diagonal, a triangular part of the spacecraft membrane is folded in a zigzag-shaped way.

The spacecraft membrane may comprise spring elements which bias the spacecraft membrane into a packed or unpacked state. In a zigzag folding, the spring elements may for example bias the single folds from the unfolded state into the folded state. If the spring elements for example bias the spacecraft membrane into a packed state, they enable a packing ("restowing") of the spacecraft membrane even during operation of the spacecraft, that is, when usually no human access is possible. If, therefore, the pulling force effective onto the (longitudinal and/or transverse) corners of the spacecraft membrane, which is also used for unpacking, increases, the spacecraft membrane due to the effect of the spring elements automatically packs itself back together. The spring elements may also bias the spacecraft membrane only into a partially packed or partially unpacked state so that for example the spacecraft membrane can only re-establish the transverse package, but not the longitudinal package. Possibly, when such spring elements are used, a higher effort of force may be necessary for unpacking the spacecraft membrane because during unpacking work has to be done against a pre-tension of the spring elements.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a corner is mentioned, this is to be understood such that there is exactly one corner or there are two corners or more corners. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

In the following, for construction elements of the same or different embodiments which have the same or a similar design and/or function, the same reference signs are used. For such construction elements which occur multiply, for example on two sides of a symmetry axis, these are differentiated by attached letters or roman numerals. These construction elements are also referred to collectively without the letters or roman numerals.

Figure 1:
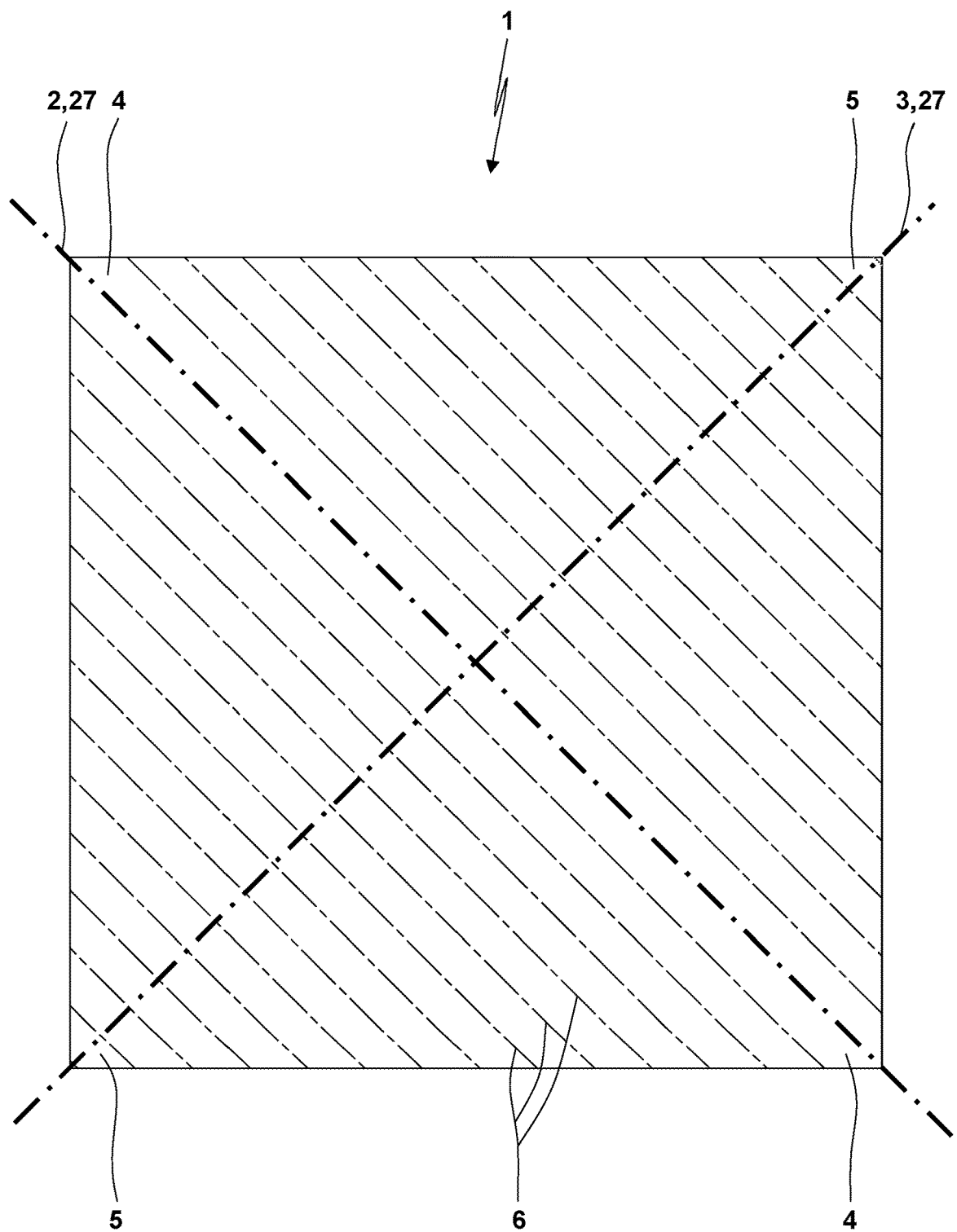
FIG. 1 shows a spacecraft membrane in a top view.

FIG. 1 shows a square spacecraft membrane 1. The spacecraft membrane 1 comprises a longitudinal axis 2 and a transverse axis 3. Due to the square shape of the spacecraft membrane 1, the longitudinal axis 2 and the transverse axis 3 correspond to the diagonals 27 of the spacecraft membrane 1. Opposite each other along the longitudinal axis 2, the spacecraft membrane 1 comprises two longitudinal corners 4. It also comprises transverse corners 5 lying opposite each other along the transverse axis 3. Arranged with equal distances parallel to the longitudinal axis 2 and between the longitudinal axis 2 and the transverse corners 5, the spacecraft membrane 1 comprises folding lines 6 which here are shown with dashed-dotted lines. The folding lines 6 may be formed before the packing, for example be pre-folded or marked by boundaries e.g. between neighboring photovoltaic cells, as well as only form during packing.

Figure 2:
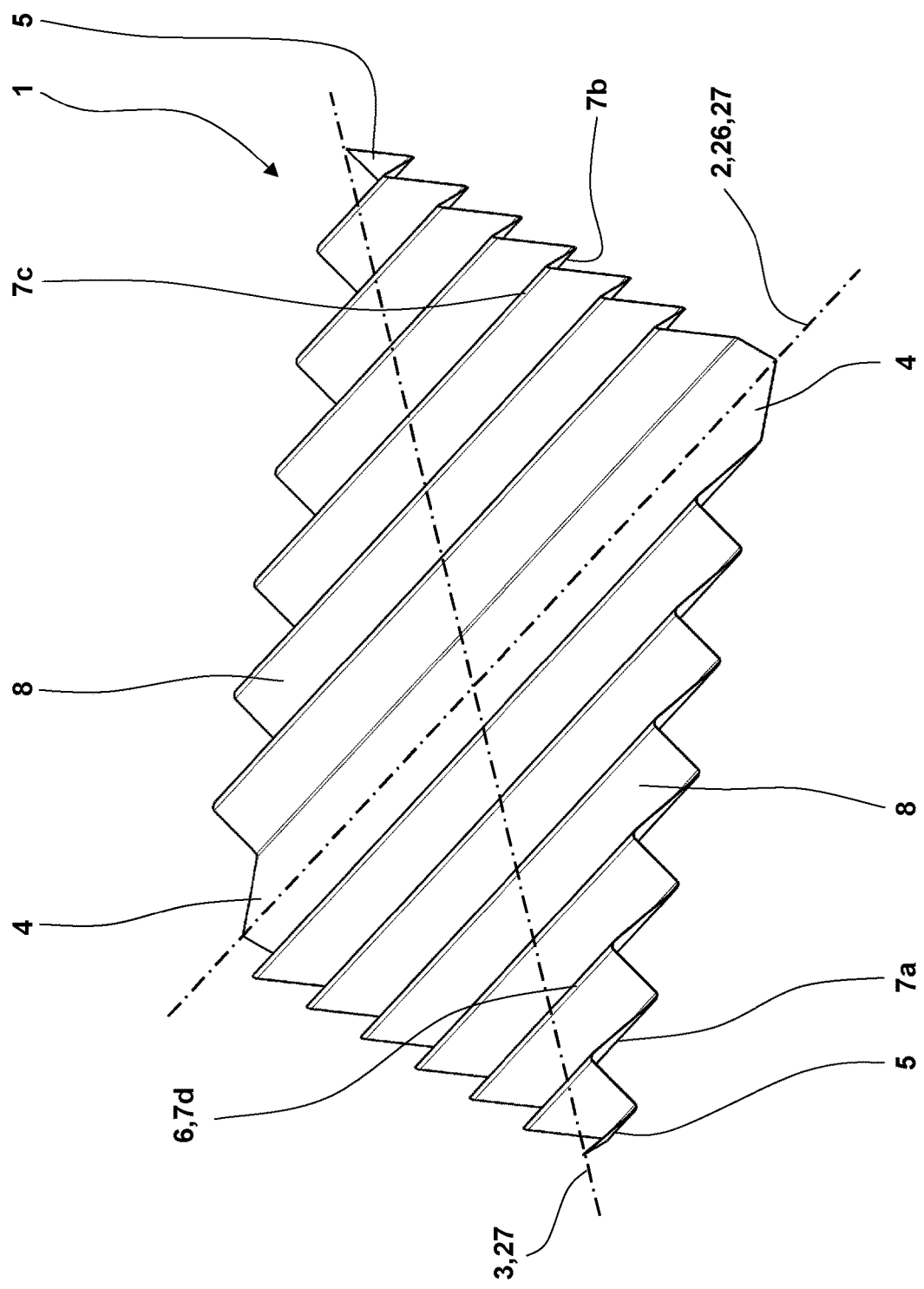
FIG. 2 shows the spacecraft membrane according to FIG. 1 in a partially packed or partially unpacked state in a perspective top view with an angle.

In FIG. 2, the spacecraft membrane 1 is shown partially unpacked or packed. Along the folding lines 6, the spacecraft membrane 1 has been brought into zigzag foldings 8, so that the folding lines 6 form folding edges 7. Due to the uniform foldings, the upper folding edges 7c,d and the lower folding edges 7a,b are arranged in parallel planes. The zigzag foldings 8 are shown mirror-symmetric to the longitudinal axis 2, which therefore is a symmetry axis 26, and here in a partially folded intermediate state, in which the zigzag foldings 8 are slightly opened.

In the region of the folding edges 7, spring elements not shown here may lie, which bias the spacecraft membrane into a packed or unpacked state. In the intermediate state shown in FIG. 2, possible spring elements therefore are tensioned in any case (at least partially).

Figure 3:
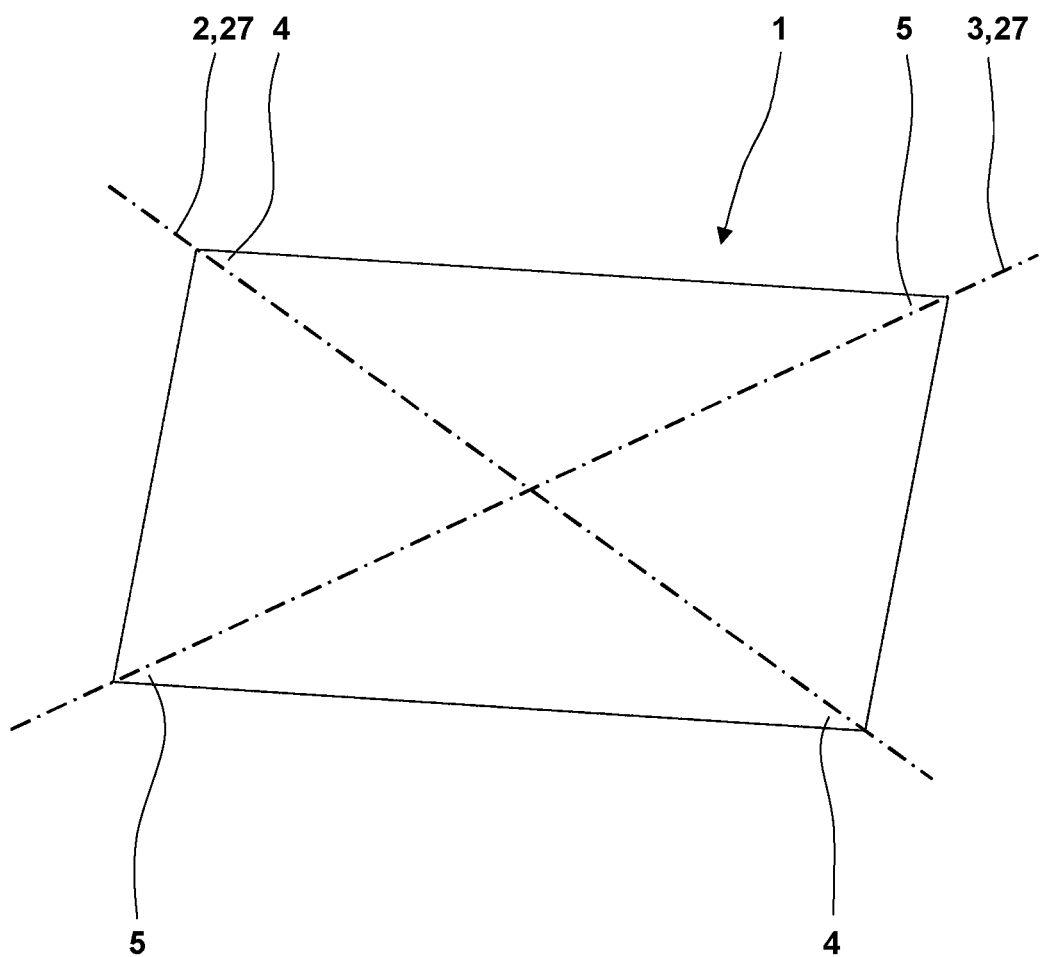
FIGS. 3 to 10 show partial steps of a first packing step, in which a spacecraft membrane is packed into a transverse package in a perspective top view with an angle.
Figure 4:
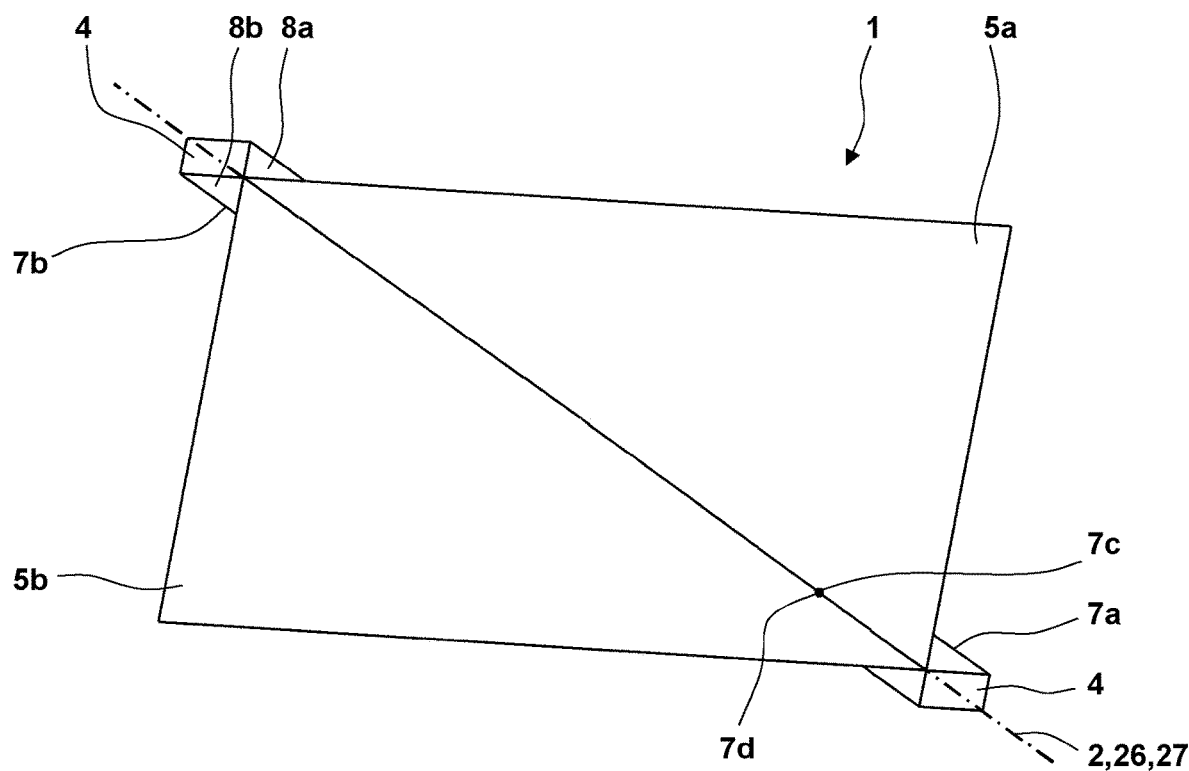
Figure 5:
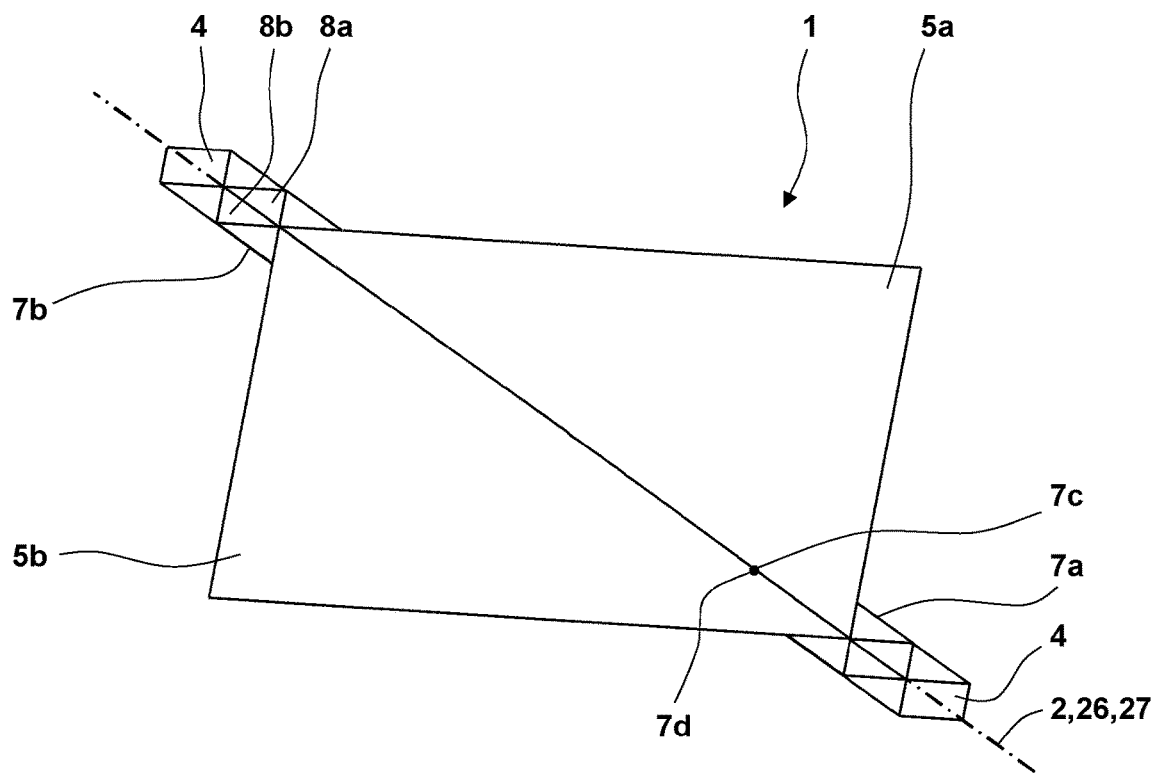
Figure 6:
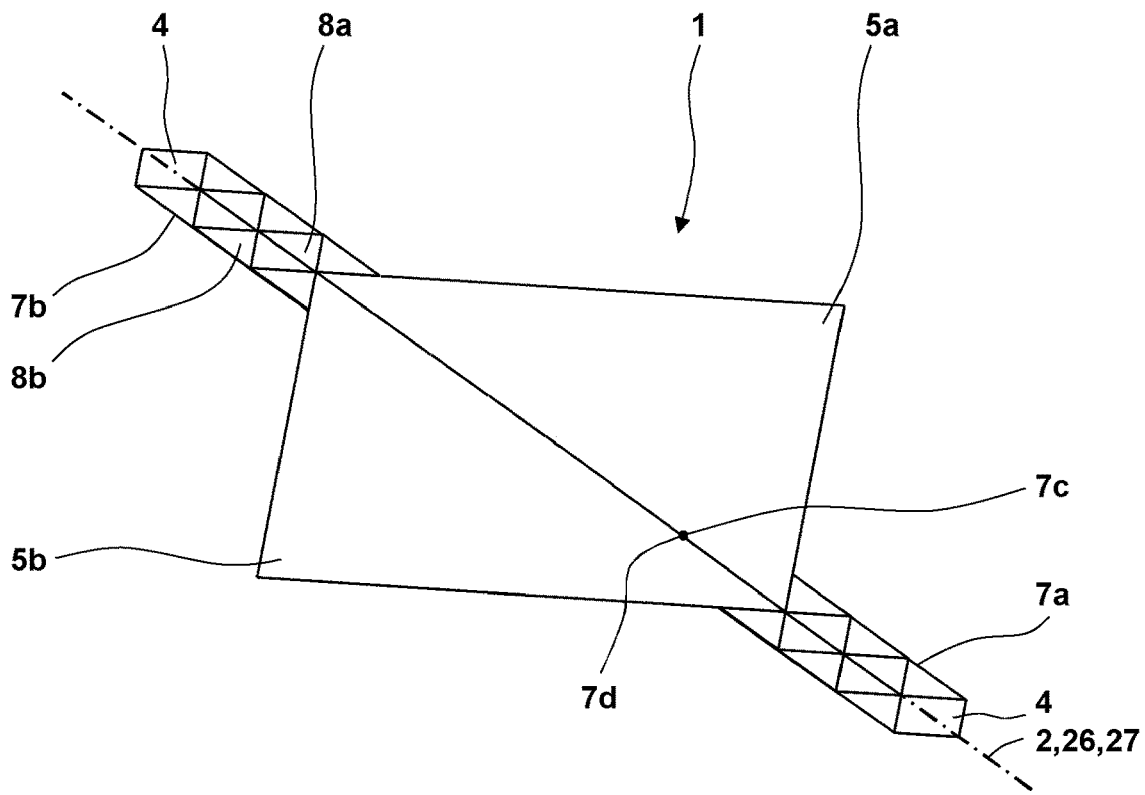
Figure 7:
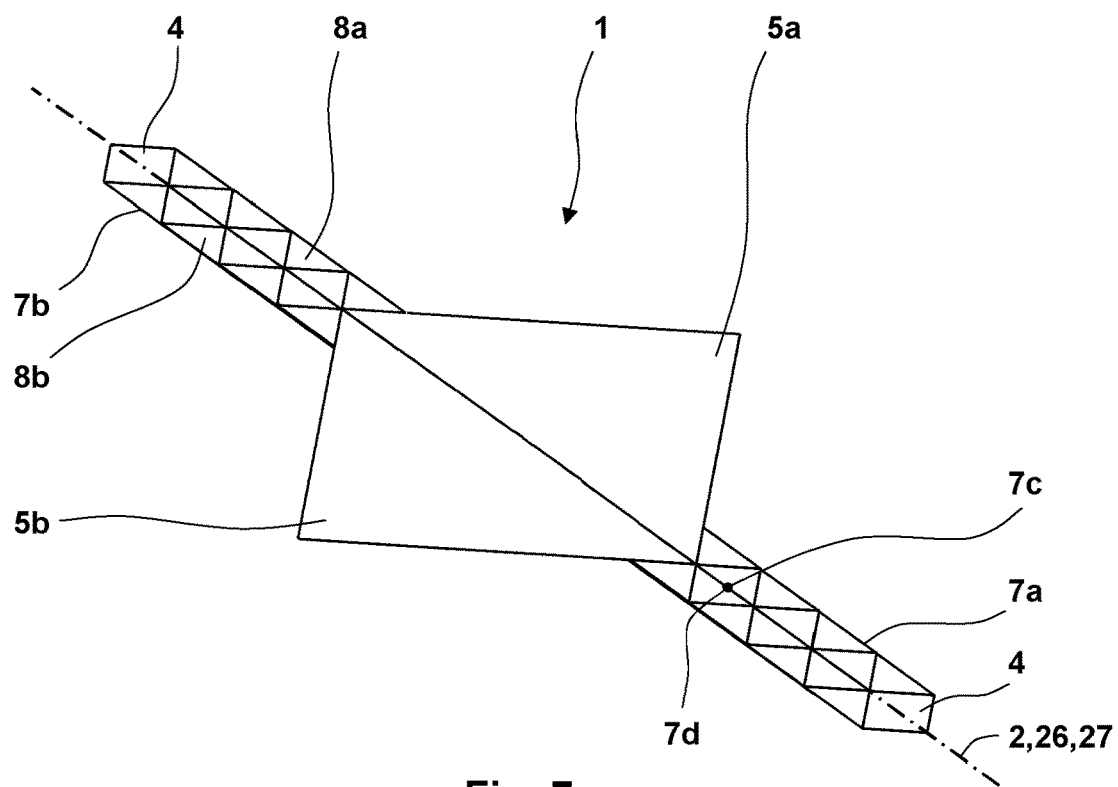
Figure 8:
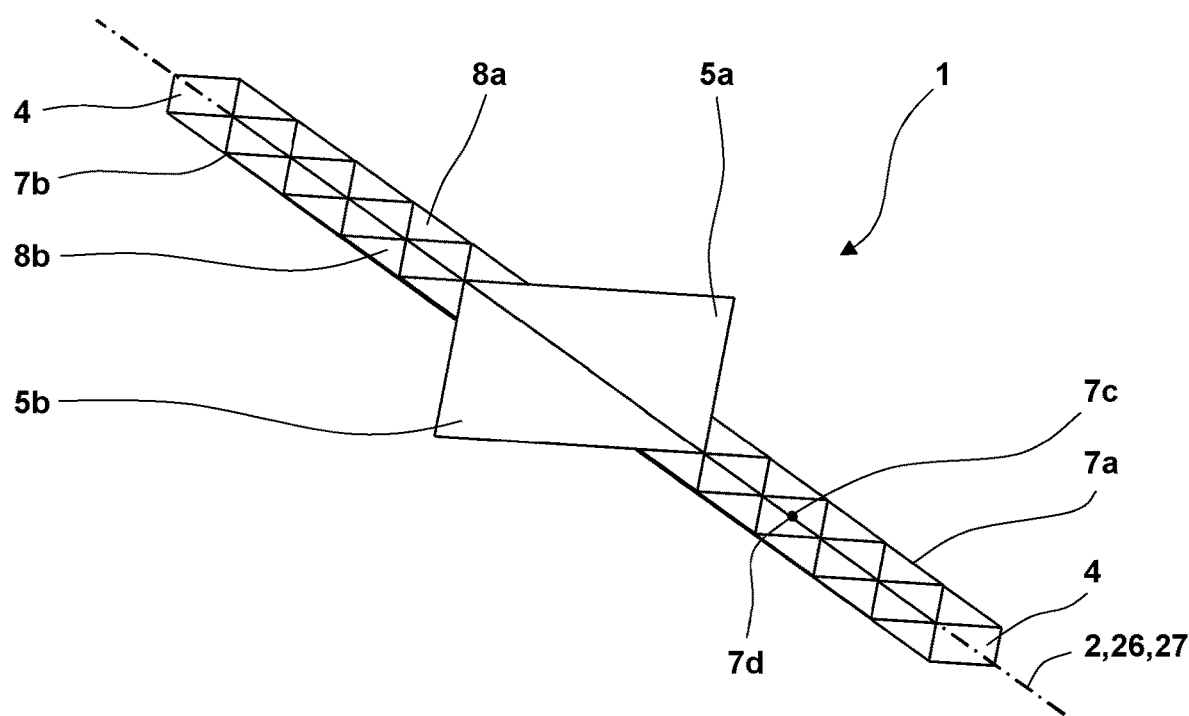
Figure 9:
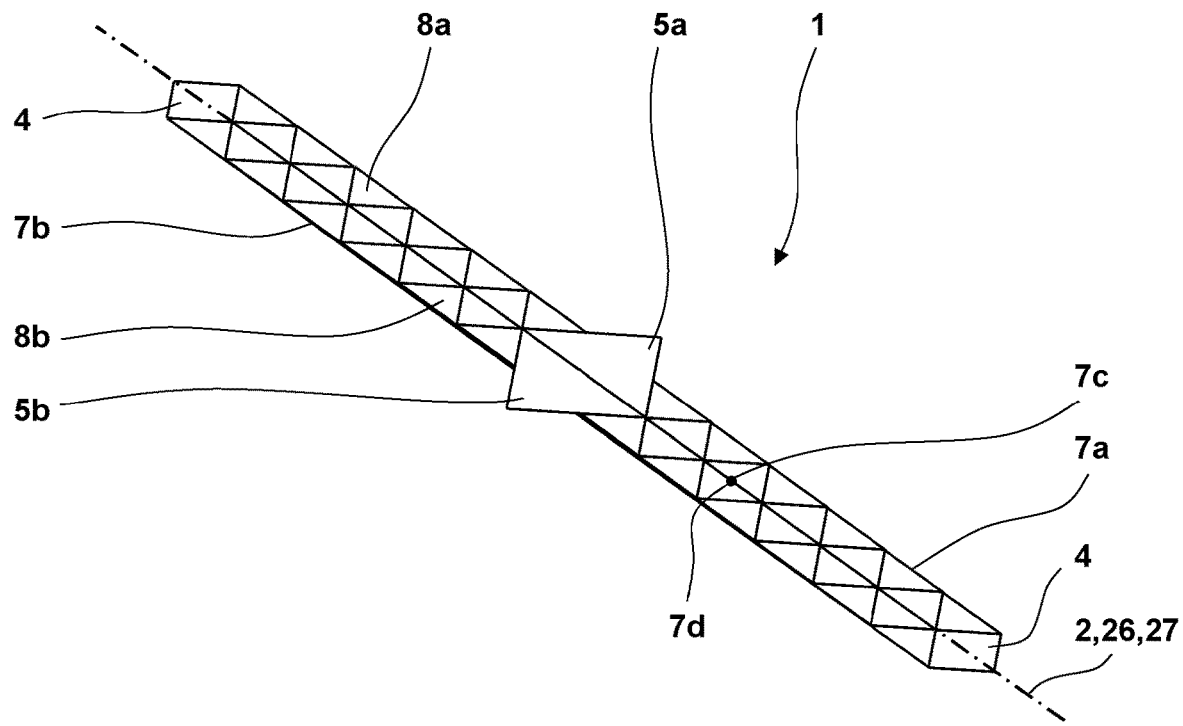

FIGS. 3 to 10 show partial steps of a first packing step of the spacecraft membrane 1. In FIG. 3, the spacecraft membrane 1 is completely spread out. In FIG. 4, a folding of the spacecraft membrane 1 begins, where the spacecraft membrane 1 at the same time (or subsequently) is folded into the two mirror-symmetric zigzag foldings 8.

FIG. 4 shows a first partial step of the first packing step. At the beginning of the zigzag folding 8, the spacecraft membrane 1 has been folded from both transverse corners 5 in the direction of the longitudinal axis 2 and at first past it and subsequently back outwards from the longitudinal axis 2. In this way, symmetric folding edges 7 have formed. The longitudinal and transverse corners 4 and 5 are free. In an analogous way, for the further partial steps shown in FIGS. 4 to 9, the spacecraft membrane 1 has in each step been folded in the direction of the longitudinal axis 2 and at first past it and subsequently back outwards with the transverse corners 5. The folding edges 7 are arranged one on top of the other in an aligned way, which also results from the equally distanced folding lines 6 according to FIG. 1.

Figure 10:
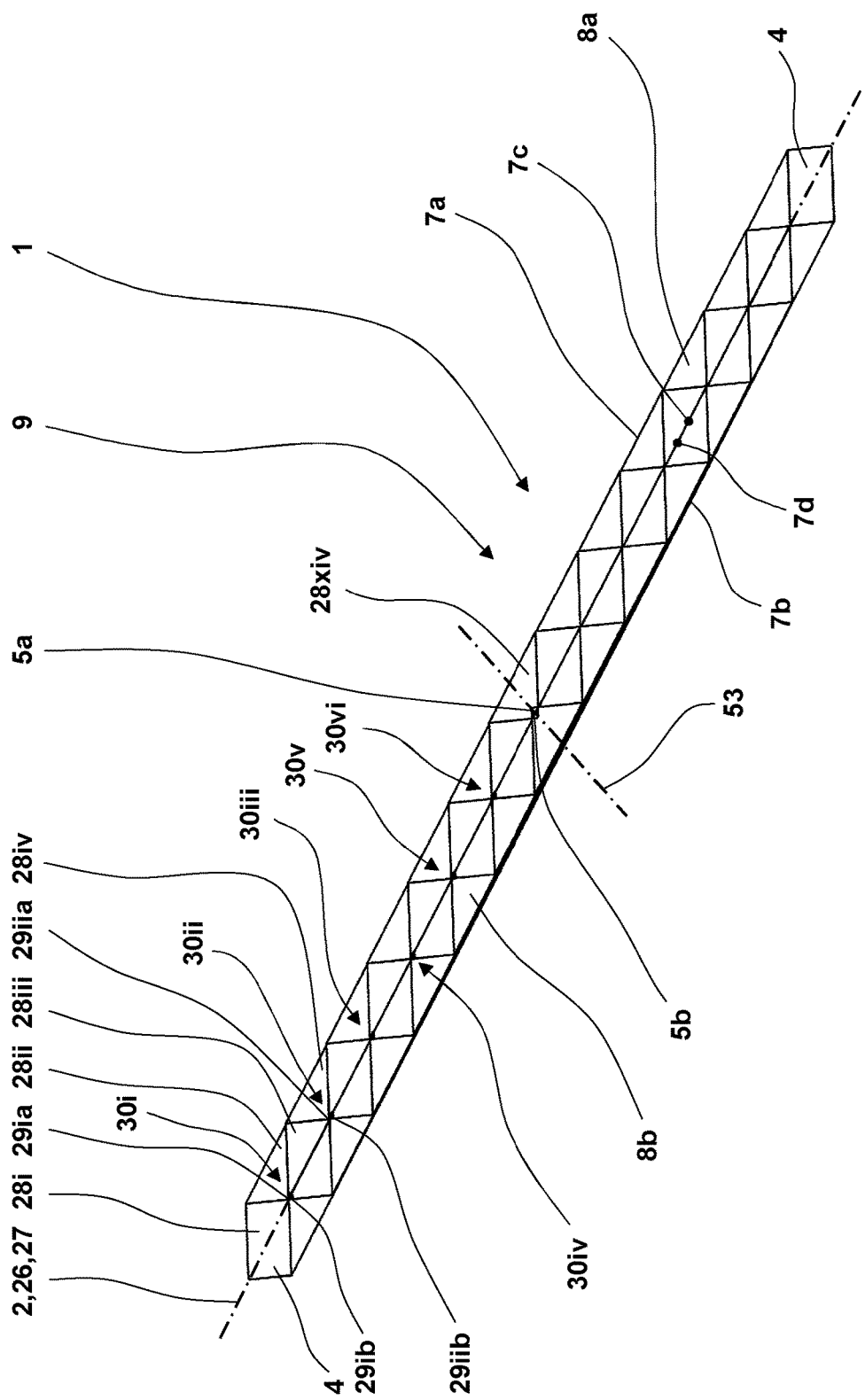

In FIG. 10, finally, the zigzag folding 8 and therefore also for the example shown the first packing step has finished. A transverse package 9 has resulted in which two zigzag foldings 8 border on each other with their folding edges 7c, 7d along the longitudinal axis 2. The longitudinal corners 4 and transverse corners 5 are free. The transverse extension of the transverse package 9 corresponds to the sum of the transverse extensions of the two zigzag foldings. The transverse package 9 comprises two partial transverse packages which are each arranged on one side of the longitudinal axis 2.

Along the symmetry axis 26 of the transverse package 9, therefore, in each case symmetric layers 28 of the spacecraft membrane 1 abut each other along their folding edges 7. Circumferential edges of the spacecraft membrane 1 due to the zigzag foldings 8 run in a meander-shaped or zigzag-shaped way between the outer edges of the transverse package 9 and the symmetry axis 26. The transverse package 9 comprises more layers 28 the further one approaches its centre as seen along the symmetry axis 26. In the following, the letters i, denote the single folds (or corresponding construction elements, cp. the securing devices 30i, 30ii, . . . ) from the outside in, while the letters a or b denote the side right or left of the longitudinal axis 2. In the centre, a top layer 28xiv is formed with the transverse corners 5. Lying outwards, the bottom layer 28i is free. Above it, that is, folded inwards in the direction of the symmetry axis 26, the second layer 28ii is arranged. Folded outwards again is the third layer 28iii. Therefore, of the second layer 28ii only a triangle remains free. At the tip of this triangle on the folding edge 7c, 7d, a first break point 29i is formed. In an analogous way, the fourth layer 28iv folded inwards again forms a triangle at the tip of which on the folding edge 7c, 7d a second break point 29ii is located. Due to the symmetry of the zigzag folding, the transverse package 9 has opposite break points 29ia, 29ib; 29iia, 29iib; . . . , therefore also bordering one another and corresponding to one another. Always between the pairs of break points 29a, 29b, a securing device 30 is arranged. In the example shown, the transverse package 9 therefore comprises fourteen layers 28i, 28ii, 28xiv and twelve pairs of symmetric break points 29a, 29b and twelve securing devices 30. In FIG. 10, the securing devices 30 are not shown since they would not be discernible due to their size.

Figure 11:
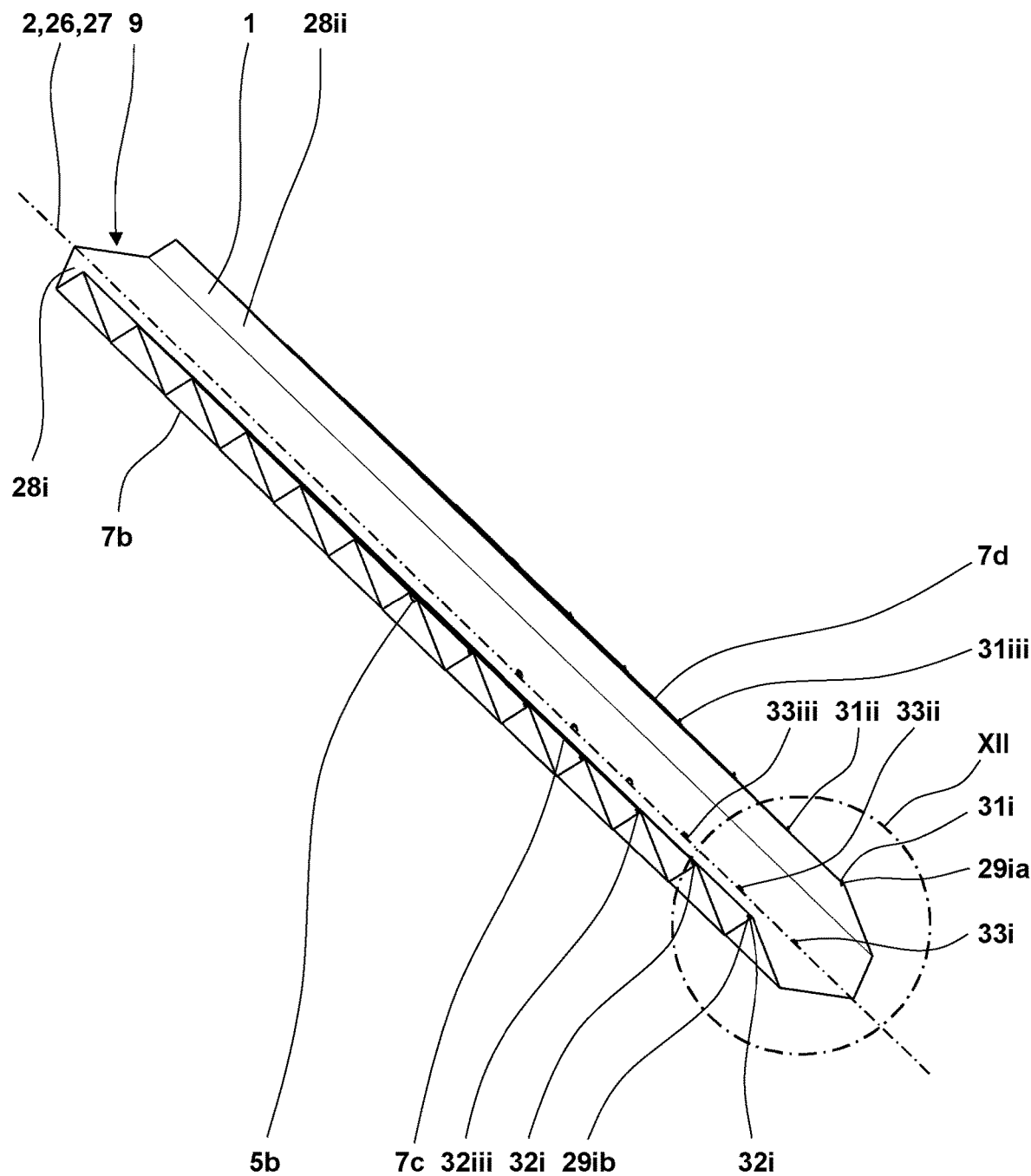
FIG. 11 shows the spacecraft membrane in a partially packed or partially unpacked state with separated securing elements of securing devices in a perspective top view with an angle.
Figure 12:
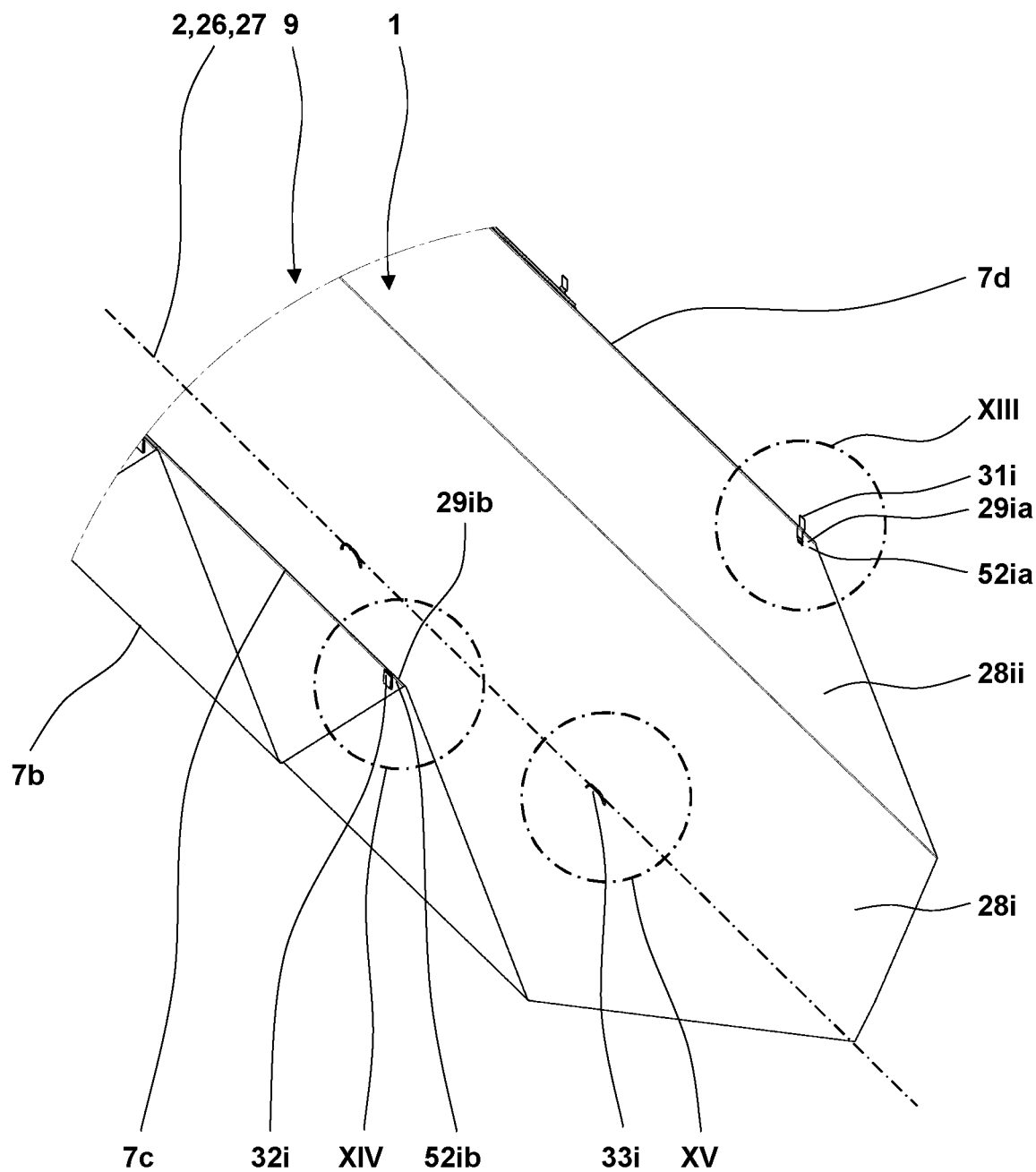
FIG. 12 shows an enlarged detail XII from FIG. 11.

FIG. 11 shows the transverse package 9, where the securing devices 30 are shown in the opened state. In order to allow for clarity of the depiction, in FIG. 11 not all securing devices 30 are shown, but only six securing devices 30, that is 30i, 30ii, 30iii, . . . for one half of the spacecraft membrane package 12. In FIG. 11, the symmetric zigzag foldings 8 are almost completely folded. Only the second layer 28ii is lifted off the lowest layer 28i so that the securing devices 30 may be seen better. The securing devices 30 shown each comprise three securing elements, which here are plugs 31, clamps 32 and loops 32. The plugs 31 are arranged along a first folding edge 7c each on securing points 52a in the region of the break points 29ia, 29iia, 29iiia, . . . . On the opposite side, along the folding edge 7d, the clamps 32 are each arranged on securing points 52b in the region of the break points 29ib, 29iib, 29iiib, . . . . Along the symmetry axis 26 or the diagonal 27, the loops 33i, 33ii, 33iii, . . . are arranged in an equally distributed way. FIG. 12 shows this in an enlarged detail.

Figure 13:
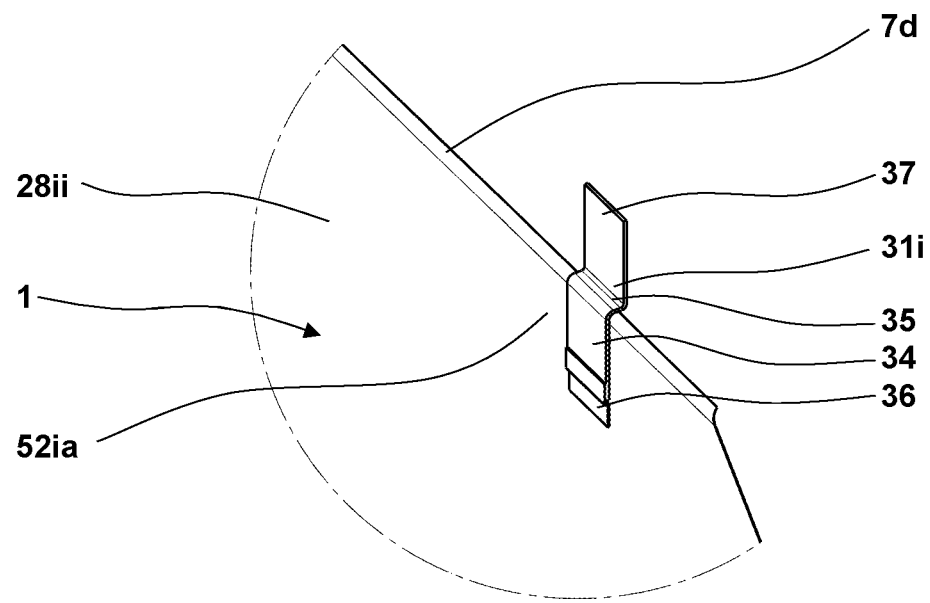
FIG. 13 in an enlarged detail XIII from FIG. 12 shows a plug of the securing device.

FIGS. 13, 14 and 15 again are enlarged details from FIG. 12. FIG. 13 shows the plug 31. The plug 31 with a resting section 34 rests against the spacecraft membrane 1. In an edge section 35, the plug 31 may be angled along the folding edge 7. In a fixing section 36, the plug 31 is connected to the spacecraft membrane 1, for example with a substance-to-substance bond. The fixing section 36 may form a thin film joint. In the simplest case, the fixing section 36 may for example be formed with a piece of adhesive tape. In an extension section 37, the plug 31 extends over the folding edge 7d.

Figure 14:
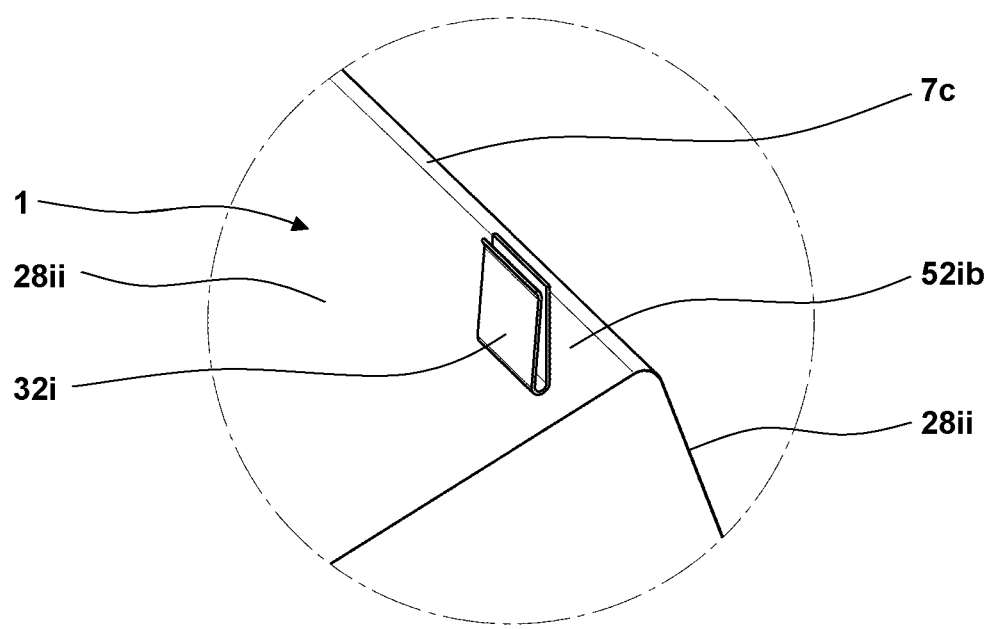
FIG. 14 in an enlarged detail XIV from FIG. 12 shows a clamp of the securing device.

The clamp 32 in cross section is approximately U-shaped (cp. FIG. 14) and with one side arm of the U is connected to the spacecraft membrane 1 with a substance-to-substance bond. The end of this side arm limiting the opening of the U ends in alignment with the folding edge 7, which does not necessarily have to be the case.

Figure 15:
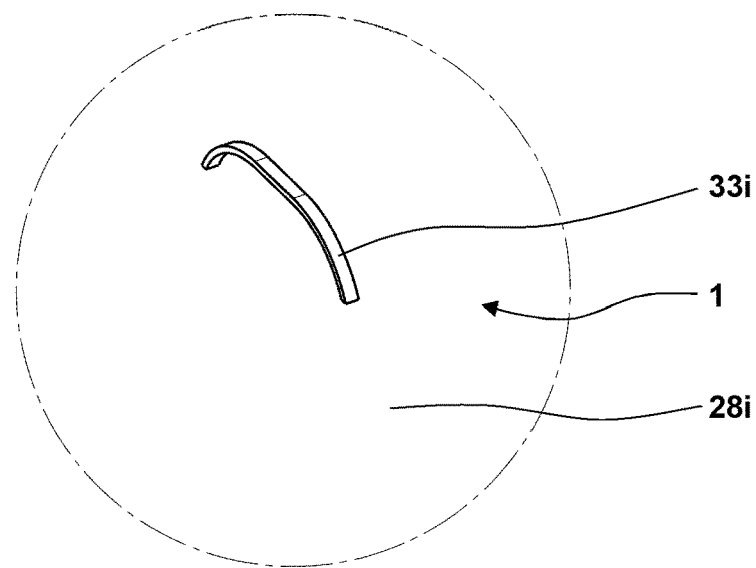
FIG. 15 in an enlarged detail XV from FIG. 12 shows a loop of the securing device.

FIG. 15 shows the loop 33 which in the region of the longitudinal axis 2 is arranged on the bottom layer 28i of the spacecraft membrane 1. The loop 33 may be rigid or elastic.

Figure 16:
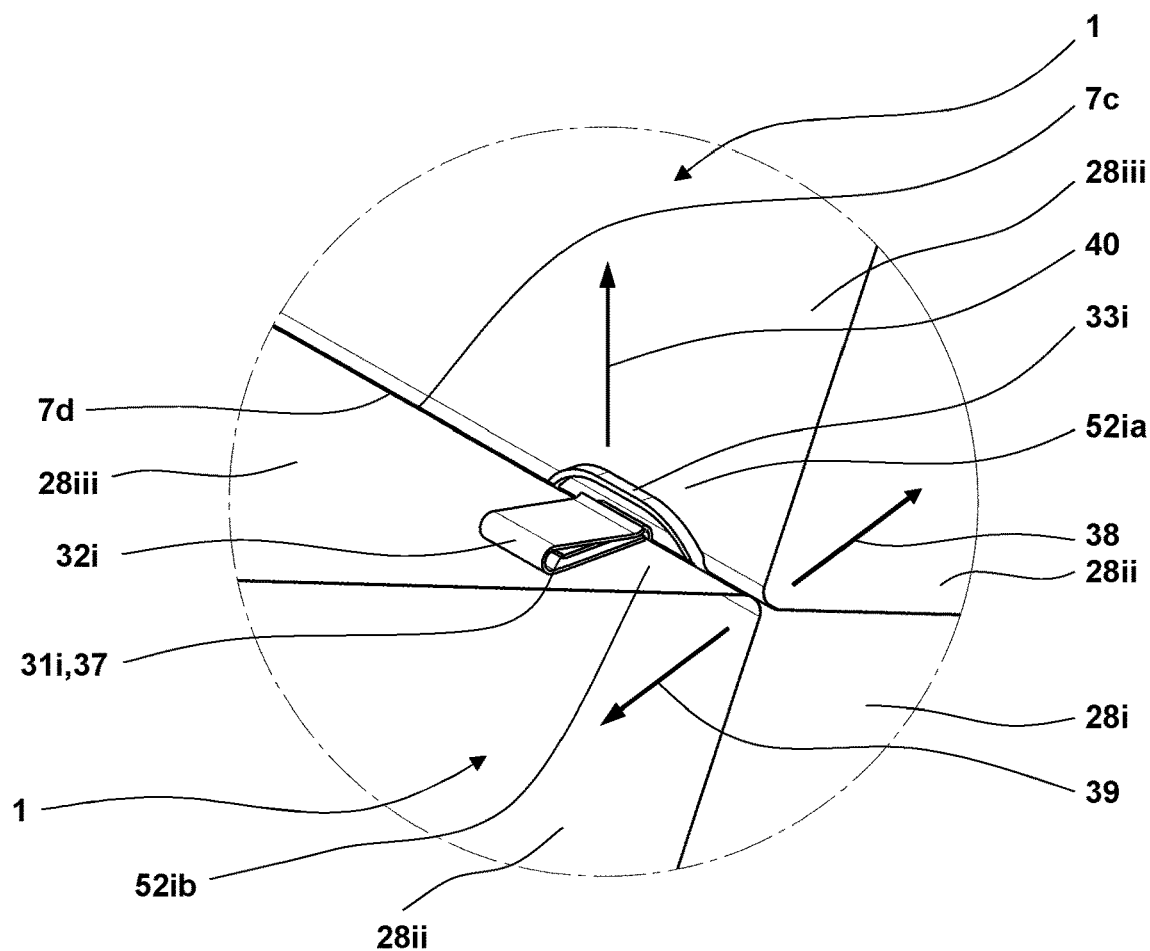
FIG. 16 shows a detail of a packed or unpacked spacecraft membrane with a closed securing device with plug, clamp and loop.

FIG. 16 in a resolution comparable to FIGS. 13 to 15 shows the securing device 30 in a closed state. The plug 31 with its extension section 37 has been inserted into the clamp 32. The plug 31 is held in the clamp 32 friction-lockingly and by the clamping effect of the clamp 32. Due to the fact that the plug 31 was put through the loop 33 before, plug 31 and clamp 32 in the connected state are caught between the bottom layer 28i and the loop 33. The transverse package 9 in this way is secured against unpacking the three directions:

Through the connection between plug 31 and clamp 32, a securing occurs in the directions 38, 39 into which unfolding pulling forces are effective in a controlled unfolding.

Through the loop 33, a securing occurs in the direction 40 perpendicular to the directions 38, 39 and perpendicular to the bottom layer 28i.

It also becomes apparent from FIGS. 12 to 16 that the securing device 30 or its securing elements do not have to be placed exactly in the break points 29a, 29b. Especially for practical reasons, the securing points 52a, 52b are arranged slightly offset to the break points 29. For the securing effect of the securing device 30 it is not material, either, whether it is arranged in the break points 29 themselves. Rather than that, the securing device 30 can display its securing effect in the same way in any other position along the folding edge 7. It is, however, advantageous if the securing device 30 is arranged at or directly neighboring the break points 29, because in this way possibly a development of folds or creases in the spacecraft membrane 1 in unpacking may be avoided.

Figure 17:
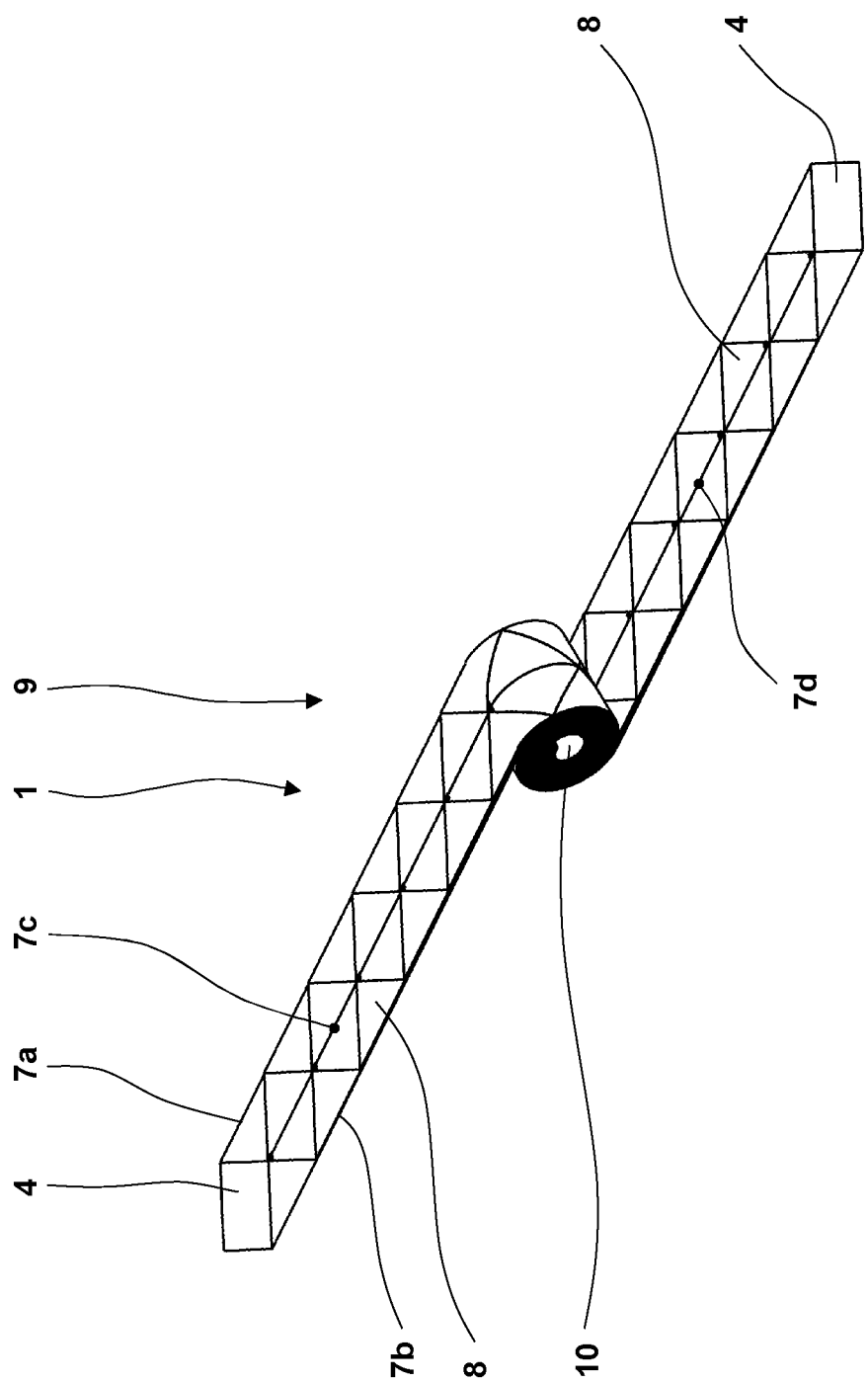
FIGS. 17 and 18 show partial steps of a second packing step, in which the transverse package according to FIG. 10 is packed into a longitudinal package, in a perspective top view with an angle.

In FIG. 17, a second packing step begins. In order to achieve this, the transverse package 9 is wound around a winding centre 10. The winding centre 10 may optionally comprise a spool body not shown here. The winding begins on the transverse package 9 approximately at the level of the transverse corners 5 centrally along the longitudinal axis 2. The transverse package 9 may be folded centrally so that the longitudinal corners 4 lie one above the other and the winding begins at the central folding edge 53 formed in this way.

Figure 18:
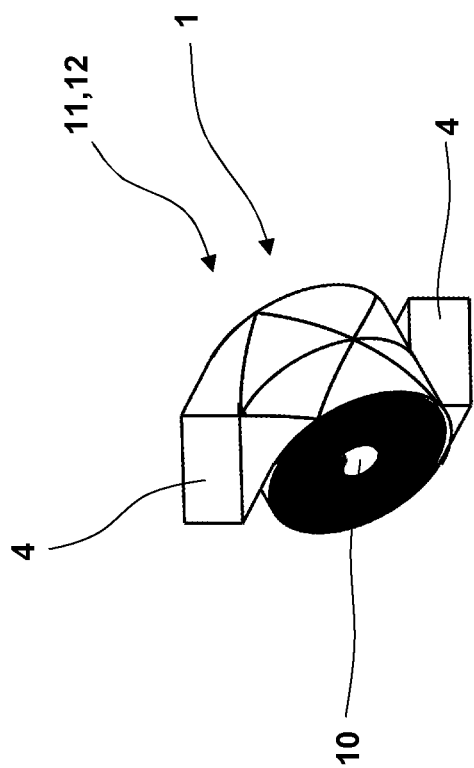

In FIG. 18, the second packing step has been finished. The transverse package 9 has been packed into a longitudinal package 11 and therefore into a spacecraft membrane package 12, that is, here it has been wound. It can be seen that the longitudinal corners 4 still are free, which here occurs on opposite sides of the circumference of the winding formed by the longitudinal package 11, where the longitudinal corners 4 point in opposite directions. The transverse corners 5 for this embodiment of the spacecraft membrane package 12 lie in the interior of the longitudinal package 11 close to the winding centre 10. If they are to be connected to external elements such as for example a spacecraft membrane handling mechanism, this may be done for example by ropes or wires, however. Optionally, securing devices may be mounted against (un-)winding which are not shown in FIGS. 17 and 18.

For the case that the creation of the longitudinal package 11 is achieved by a winding corresponding to FIGS. 17, 18, the folding edge 53 may also be arranged non-centrally, in which way then different lengths of the transverse package 9 are wound on both sides of the folding edge 53. In this way, for example, depending on the requirements it can be preset in which circumferential portion of the created winding according to FIG. 18 the longitudinal corners 4 are arranged and how the longitudinal corners 4 are arranged relative to one another on the winding formed.

FIGS. 18, 17 and FIGS. 10 to 3 may correspondingly be gone through backwards as an unpacking process. By exerting pulling forces onto the spacecraft membrane package 12 onto the longitudinal corners 4 according to FIG. 18, first the longitudinal package 11 is unpacked, that is, here it is unwound. Finally, the state according to FIG. 10 is reached again in which the transverse package 9 is present. Now, pulling forces may be exerted onto the transverse corners 5 so that the zigzag foldings 8 are unfolded until the spacecraft membrane 1 finally has reached the completely unpacked state according to FIG. 3 again (cp. also FIGS. 24 to 27).

Figure 19:
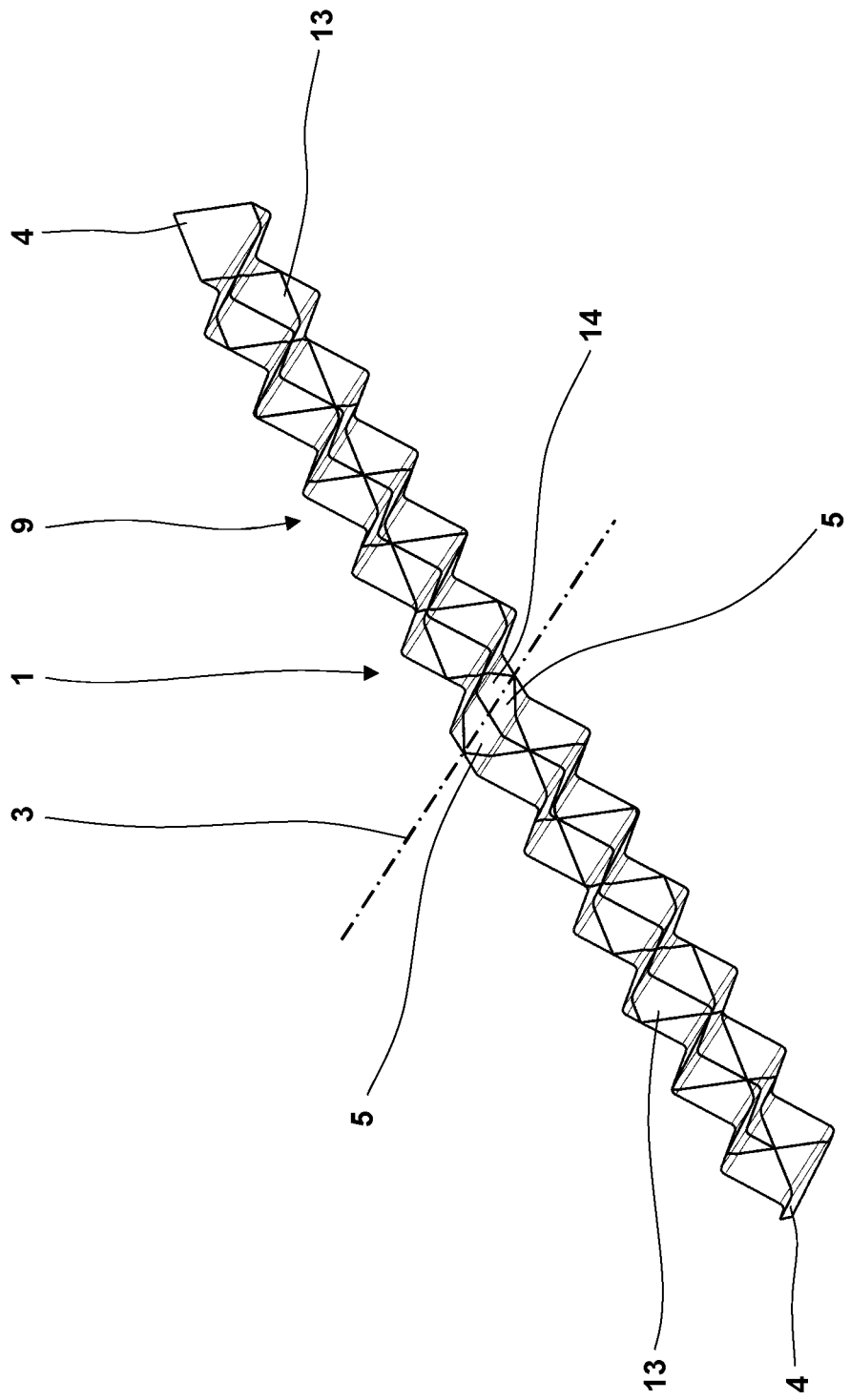
FIGS. 19 and 20 show another possible embodiment with partial steps for the second packing step in perspective top view with an angle.
Figure 20:
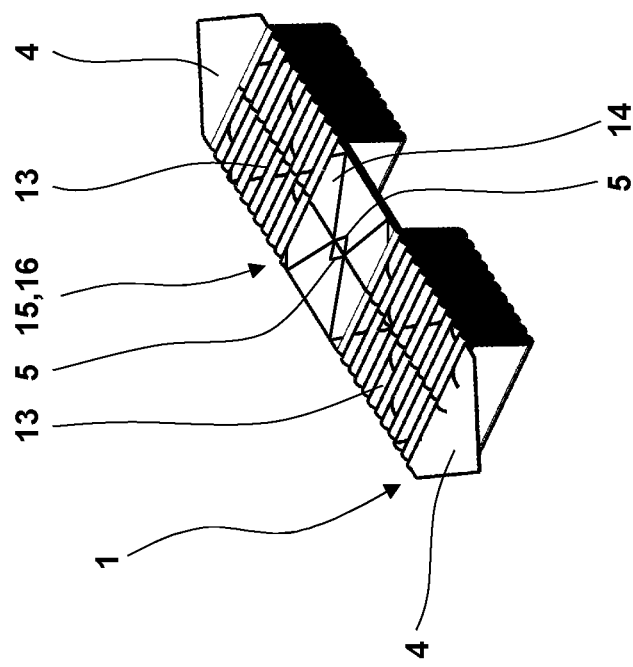

FIGS. 19 and 20 show a deviating embodiment for the second packing step: According to FIG. 19, (starting from the transverse package 9 formed before) for forming the longitudinal package 15 zigzag foldings 13 are made symmetrically to the transverse axis 3 in the way of an accordion. A bridge part 14 in the region of the transverse axis 3 remains unfolded. In the region of the bridge part 14, the transverse corners 5 remain free. Optionally, securing devices for the zigzag foldings 13 may be mounted which are not shown in FIGS. 19 and 20. In this way it is possible that the securing devices 30 secure the longitudinal package 15 and/or securing devices secure the transverse package 8.

FIG. 20 shows a corresponding longitudinal package 15 or spacecraft membrane package 16. The now compact zigzag foldings 13 extend substantially perpendicular to a plane of extension of the spacecraft membrane 1 defined by the longitudinal axis 2 and the transverse axis 3. The longitudinal corners 4 remain free. In the region of the bridge part 14, the transverse corners 5 are also free. As described for the embodiment of FIG. 18, now by pulling on the longitudinal corners 4 the second packing step according to FIGS. 20 and 19 may be reverse and in this way the spacecraft membrane 1 unpacked. With a subsequent pulling on the transverse corners 5, as described before, the first packing step may be reversed as shown in FIGS. 10 to 3 (cp. FIGS. 24 to 27).

Figure 21:
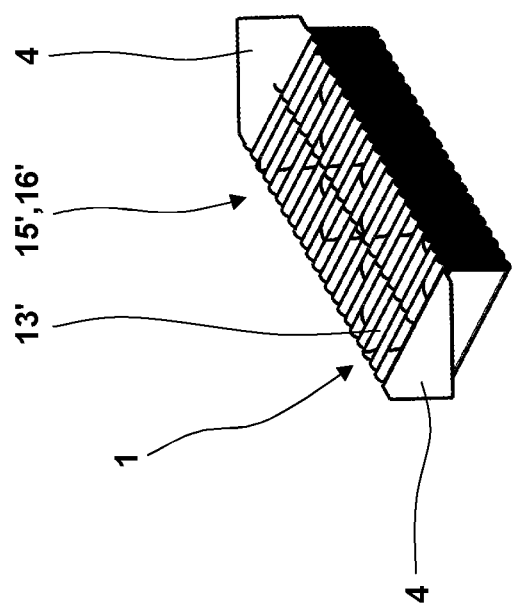
FIG. 21 shows a further possible embodiment for the longitudinal package in a perspective top view with an angle.

FIG. 21 shows a further embodiment for a longitudinal package 15' or spacecraft membrane package 16'. This substantially corresponds to the embodiment according to FIG. 20, but does not comprises a bridge part 14. A continuous zigzag folding 13' is formed in this way.

Figure 22:
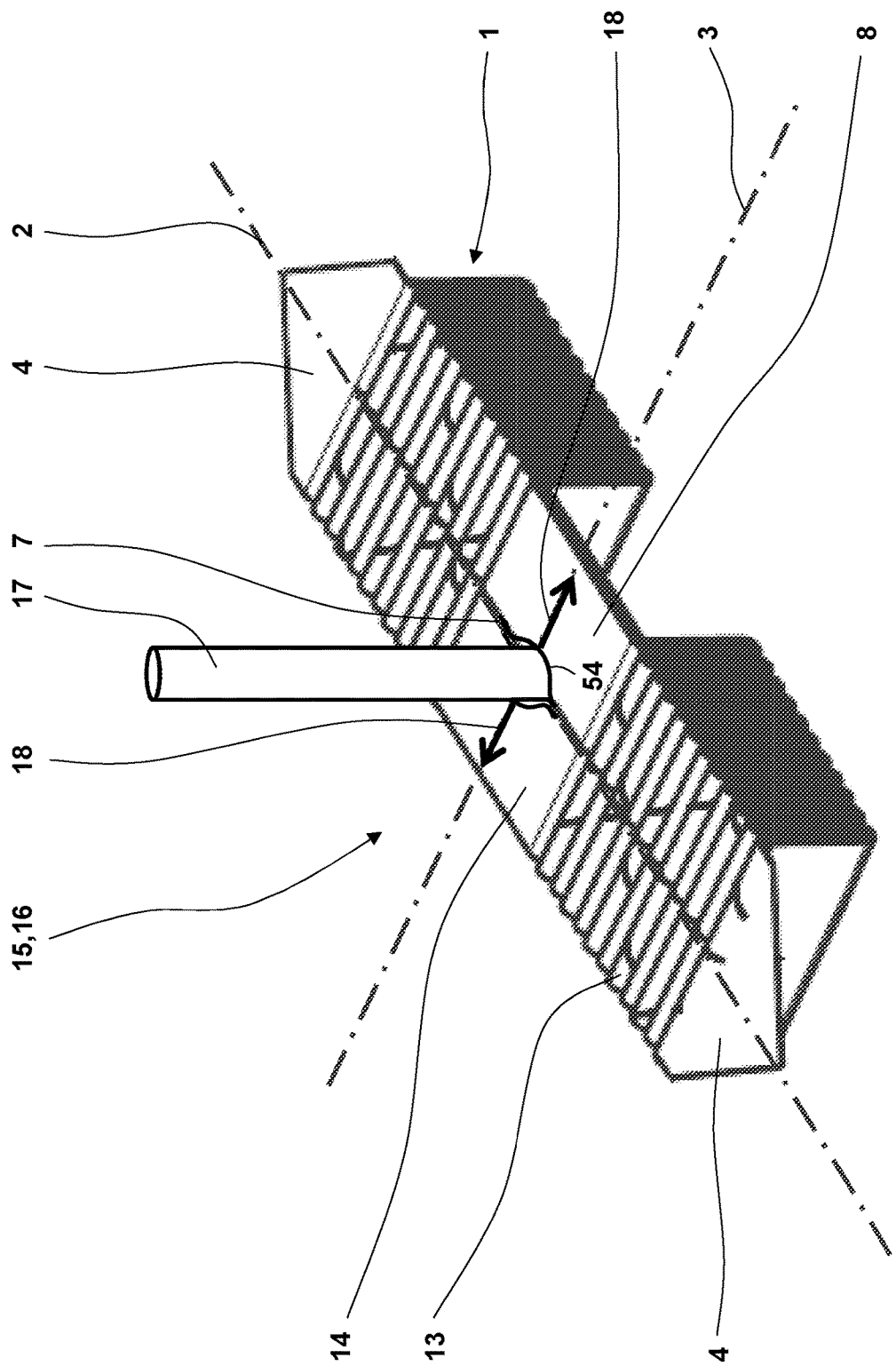
FIG. 22 shows the longitudinal package according to FIG. 20, where a mast has been fed through the longitudinal package, in a perspective top view with an angle.
Figure 23:
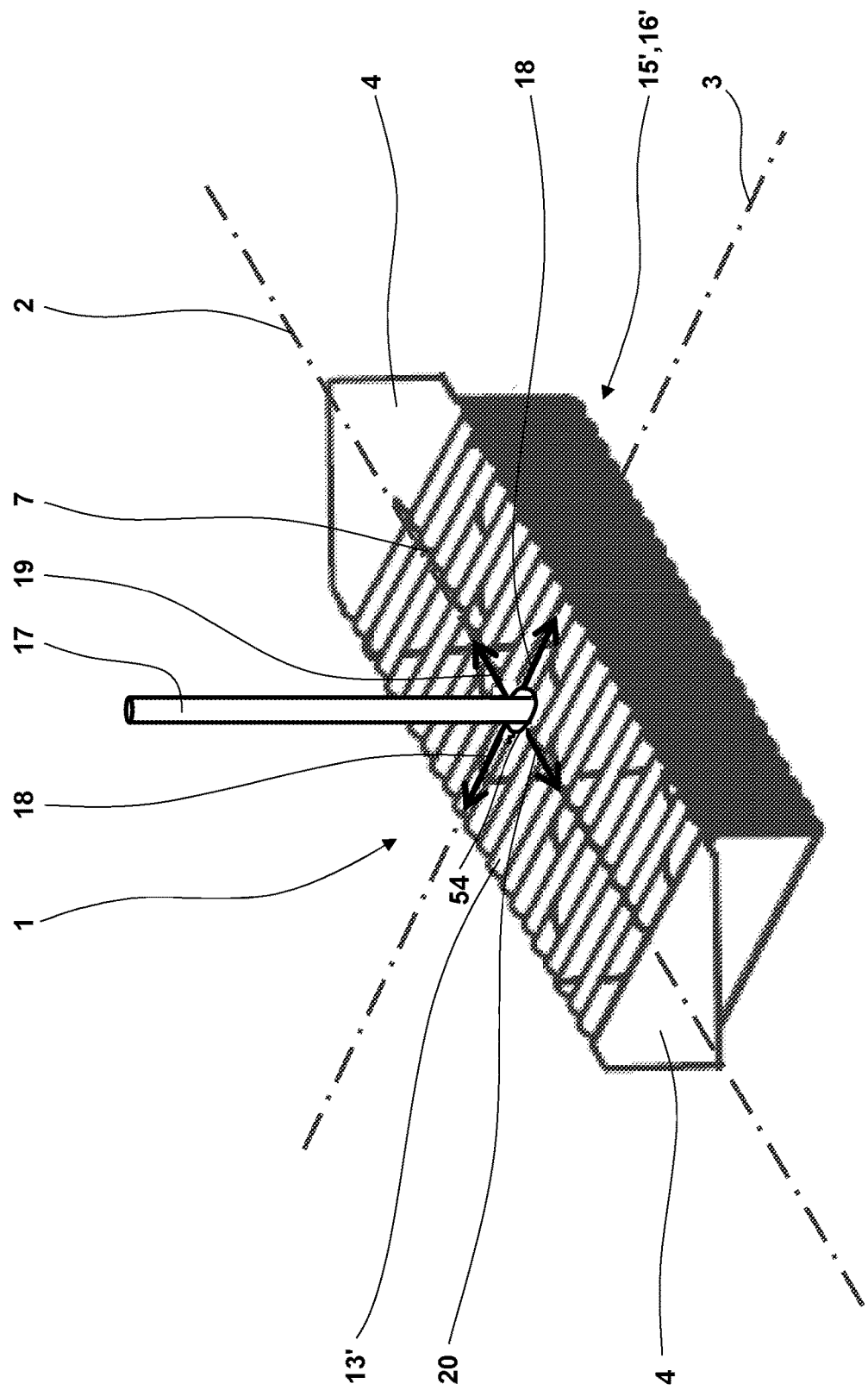
FIG. 23 shows the longitudinal package according to FIG. 21, where a mast has been fed through the longitudinal package, in a perspective top view with an angle.

As shown in FIGS. 22 and 23, the bridge part 14 may be advantageous especially if a construction element of the spacecraft, for example a mast 17, is to be fed through the spacecraft membrane 1. The mast 17 for example may be fed through the spacecraft membrane 1 at an intersection point of the longitudinal axis 2 and the transverse axis 3. The bridge part 14 may comprise a recess 54. In order to achieve this, the recess 54 may be formed in a bottom layer 28$i$ of the spacecraft membrane 1. Corresponding recesses may also be formed in further layers of the spacecraft membrane 1 in the region of the folding edges 7, while these recesses for the folded state of the zigzag folding 8 only have to be half as large as the recess in the bottom layer 28$i$. It is also possible, however, that as shown in FIG. 22 the mast 17 only causes a crushing 18 of the zigzag foldings 8 along the folding edges 7. If a bridge part 14 is present on the spacecraft membrane package 16, the mast 17 therefore may have a comparatively large diameter, as long as the spacecraft membrane 1 allows for a corresponding crushing 18.

The embodiment of FIG. 21, too, is suitable for feeding through (here preferably thin) masts 17, where in this case aside from the crushing 18 along the transverse axis 3 there also is a crushing 19 along the longitudinal axis 2.

Figure 24:
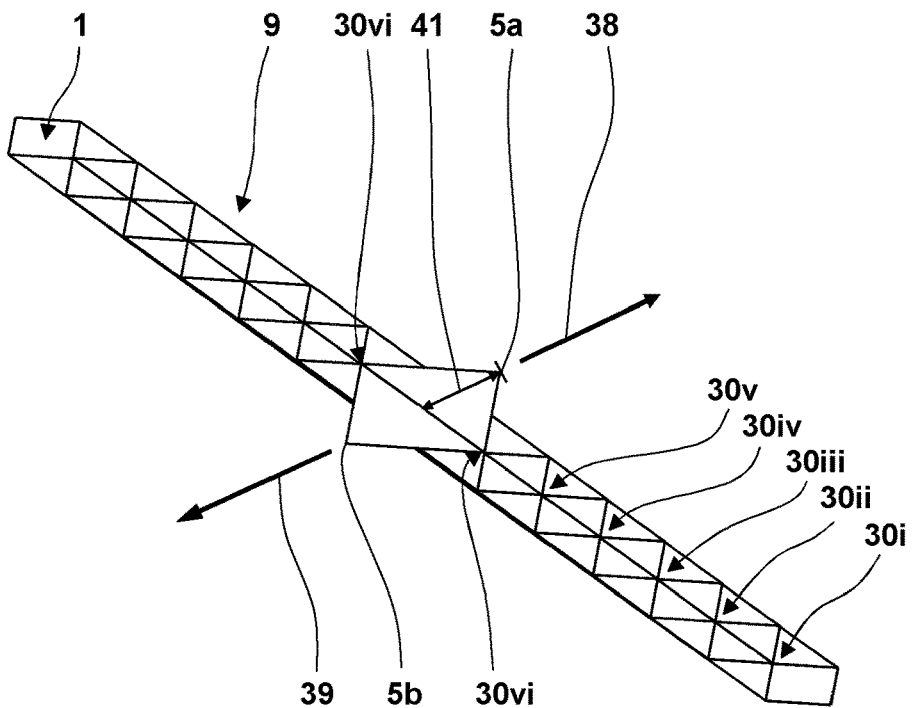
FIGS. 24 to 27 in a perspective top view with angle show an unpacking or partial unpacking of the spacecraft membrane with a successive release of the securing devices.
Figure 25:
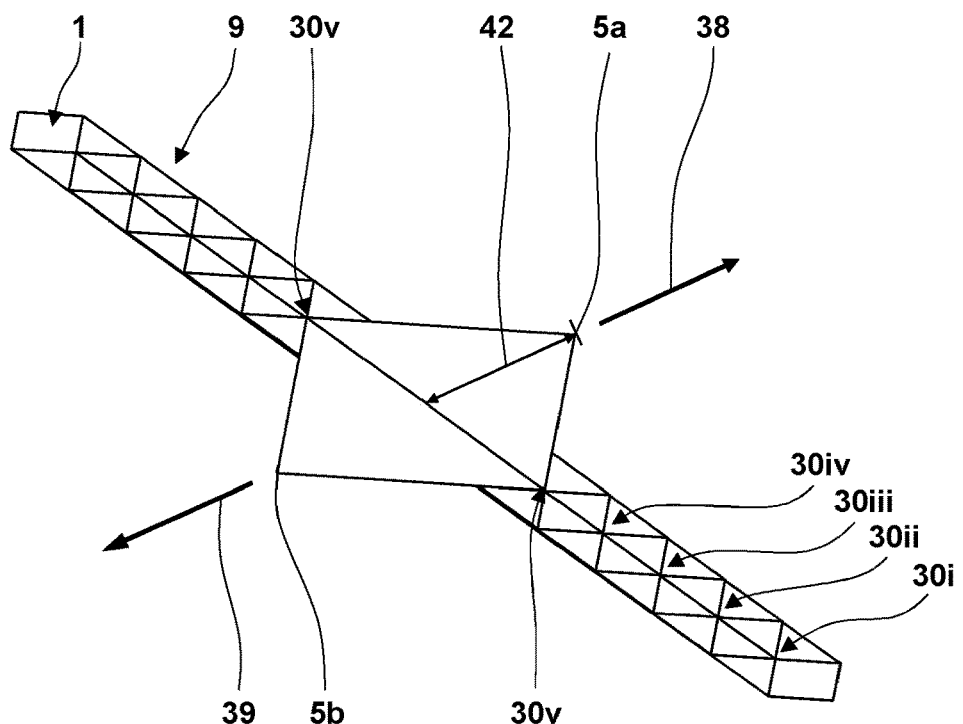
Figure 26:
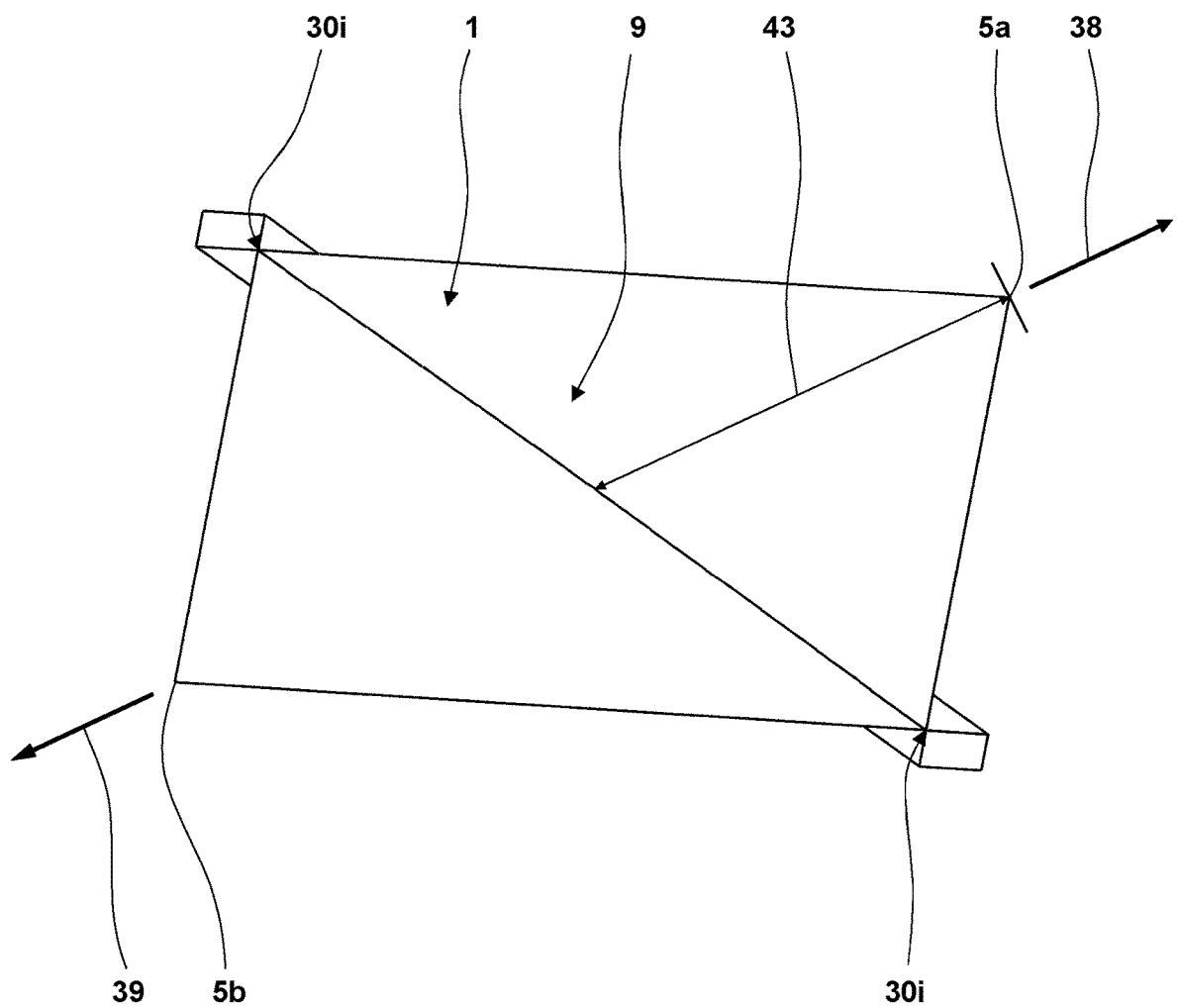
Figure 27:
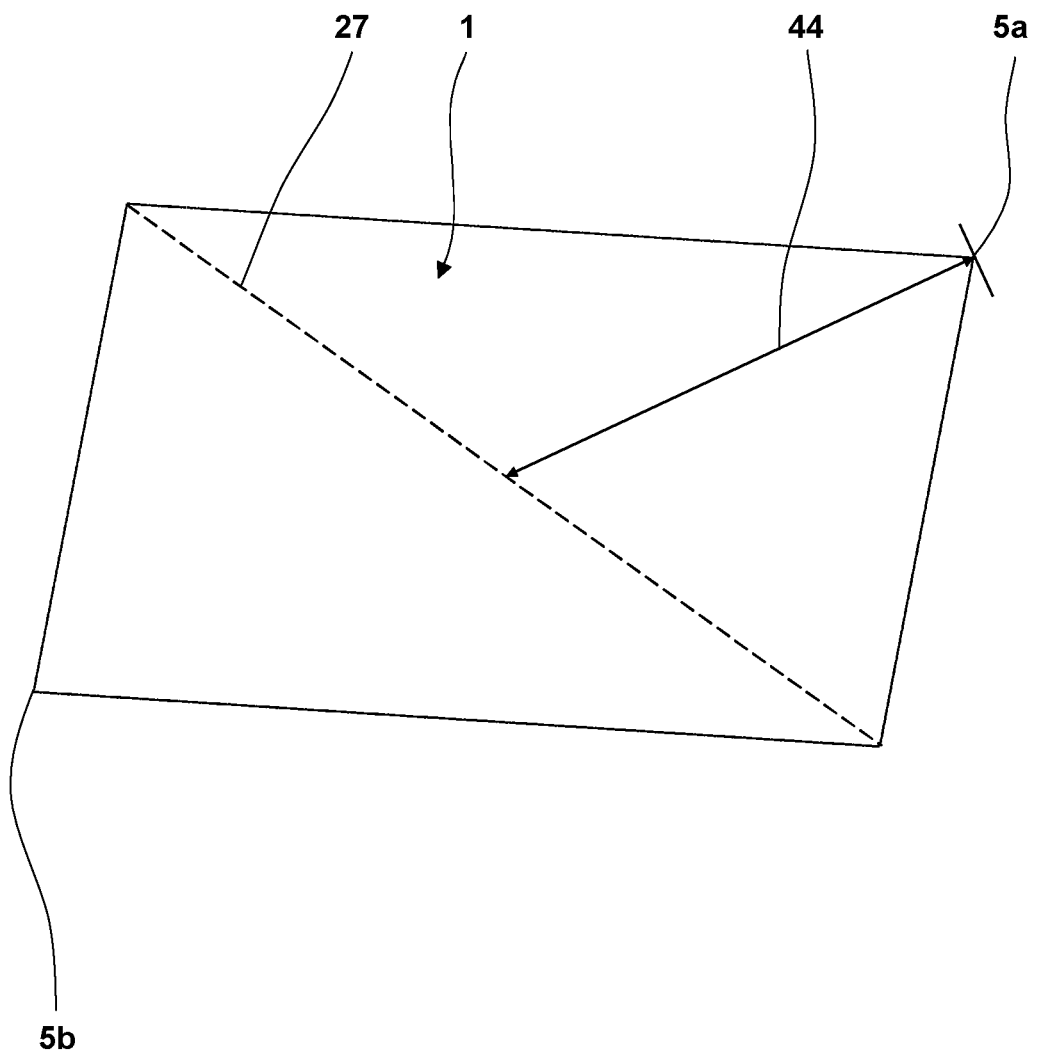

As has been described before, the securing devices 30 may be mounted at any position on the spacecraft membrane 1. The positioning of the securing device 30 in the region of the break point 29 enables a simple and controlled unfolding as shown in FIGS. 24 to 27. In order to achieve this, pulling forces are exerted onto the spacecraft membrane 1 at the transverse corners 5. In FIG. 24, due to this the spacecraft membrane 1 has already been unpacked so far that with the pulling forces in the directions 38, 39 for the first time a securing device 30$vi$ is put to the effect of pulling forces. In this way, the spacecraft membrane 1 is unpacked up to a first partial unpacking length 41 and secured against further unpacking via the securing device 30. Actively or, for example if the securing device is equipped according to FIGS. 11 to 16, passively, the securing device 30$vi$ is released. For the case that the securing device 30 is formed with the plug 31 and the clamp 32, the releasing of the securing device 30 is that due to the exerted pulling force the plug 31 is pulled out of the clamp 32. Therefore, for the release of the securing device 30 the application of a higher pulling force is necessary than for the unpacking proper. The force threshold that has to be applied for releasing the securing device 30 may be constructively preset by the clamping force of the plug 31 and the clamp 32. With another embodiment of the securing device 30, any other release of the same may be achieved. For example, destroying, pulling off or similar of a securing element of the securing device 30 is also possible. When the securing device 30$vi$ is released, for the unpacking only so much spacecraft membrane 1 is released that the subsequent securing device 30$v$ becomes active. With this securing device 30$v$, the spacecraft membrane 1 is therefore secured against a further unpacking for a second partial unpacking length 42 (FIG. 25). In the same way, step by step an increased partial unpacking length is released up to the following securing device 30$iv$, 30$iii$, 30$ii$, 30$i$. FIG. 26 shows the state in which the second largest possible partial unpacking length 43 has been reached in that only one remaining securing device 30$i$ secures the spacecraft membrane 1 against the unpacking. In FIG. 27, finally, the last securing device 30$i$ has been released and the spacecraft membrane 1 is unpacked with its largest possible (partial) unpacking length 44.

Figure 28:
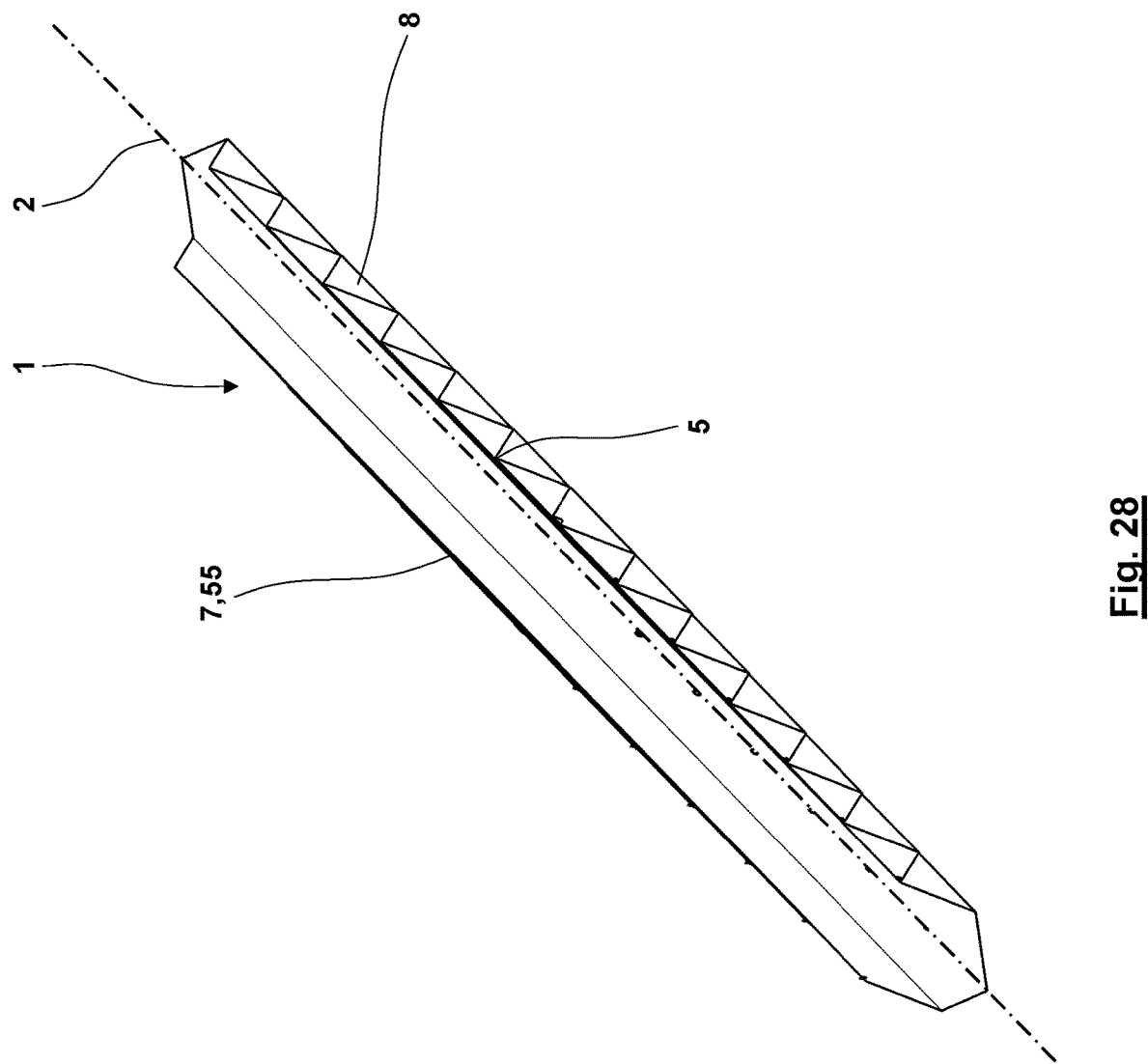
FIG. 28 shows a spacecraft membrane in a partially unpacked or partially packed state in perspective top view with an angle.

FIG. 28 shows the spacecraft membrane 1 in a partially unpacked or partially packed intermediate state, where the spacecraft membrane 1 comprises spring elements 55 (not visible in this representation here), which bias the spacecraft membrane 1 into a packed or unpacked state. If FIG. 28 represents a state in which the spring elements 55 are relaxed, for the complete unpacking of the spacecraft membrane 1 a pulling force has to be exerted against the effect of the spring elements 55. This corresponds to a normal unpacking process. If the pulling force, however, decreases, by the effect of the spring elements 55, the spacecraft membrane 1 is brought back into the partially unpacked state shown in FIG. 28. This may be desired if during an operation of the spacecraft on which the spacecraft membrane 1 is employed it is desired to re-pack the spacecraft membrane 1 at least partially in order to, for example, only make a partial area of a solar sail effective or to stow the spacecraft membrane 1 back. If the spacecraft membrane 1 is equipped, for example, with photovoltaic cells, it can be brought into the partially unpacked state in order to switch off the photovoltaic cells and avoid undesiredly high generation of electricity.

Figure 29:
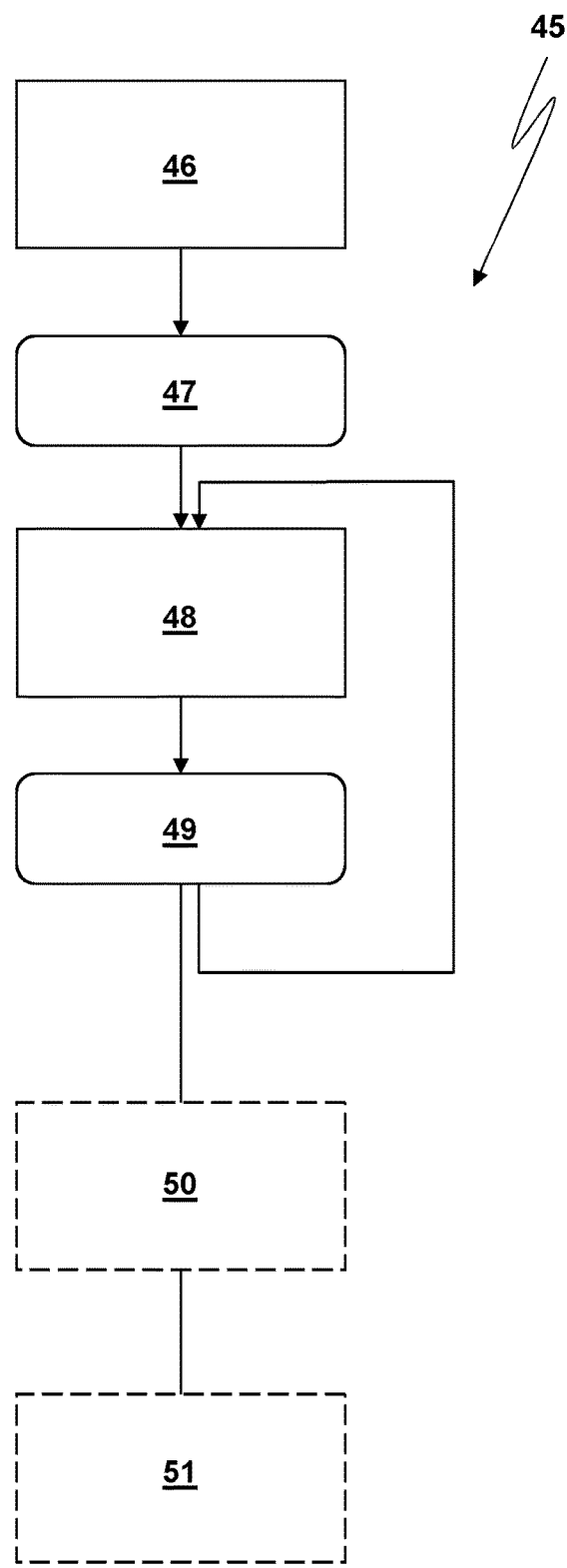
FIG. 29 shows a flowchart of a method for packing a spacecraft membrane with an application of securing devices.

FIG. 29 shows a flowchart of a method 45 for packing the spacecraft membrane 1. In a step 46, the spacecraft membrane 1 from a completely unpacked starting situation, in which the spacecraft membrane 1 has its largest possible (partial) unpacking length 44, is packed so far that it exhibits its second-largest possible partial unpacking length 43. In a step 47, this partial unpacking length 43 is secured with one or more securing devices 30$i$. Each securing device 30$i$ may be mounted between two or more neighboring (symmetrically) opposite or distanced layers 28 of the spacecraft membrane 1.

In a step 48, the spacecraft membrane 1 is further packed until it exhibits a further partial unpacking length which is smaller than the previously secured partial unpacking length 43. In a step 49, this partial unpacking length again is secured with one or more securing devices 30$ii$, 30$iii$, . . . . Steps 48 and 49 are repeated as often as desired until the spacecraft membrane 1 is completely packed. Optionally, after the final securing with the securing devices 30—here the securing device 30$vi$—the spacecraft membrane 1 in a step 50 may be finally packed, where this final packing is no longer secured. For example, one or more outer layers 28 of the spacecraft membrane 1 may be wound up which are not secured with securing devices 30.

Finally, also optionally, in a step 51 the corners 4, 5 may be connected to extendable masts, carriages or similar on the created spacecraft membrane package 12, 16, 16', in which way a spacecraft membrane handling unit is formed. By means of the masts, carriages or similar at a later point in time the unpacking may be achieved.

An unpacking, for example by using the extendable masts of the spacecraft membrane handling unit, may be doing the steps 50 to 46 backwards so that in each case the securing devices 30—here the securing devices 30*vi*, 30*v*, 30*iv*, 30*iii*, 30*ii*, 30*i*—are actively or passively released and the spacecraft membrane 1 is partially unpacked up to the subsequent secured partial unpacking length.

Figure 30:
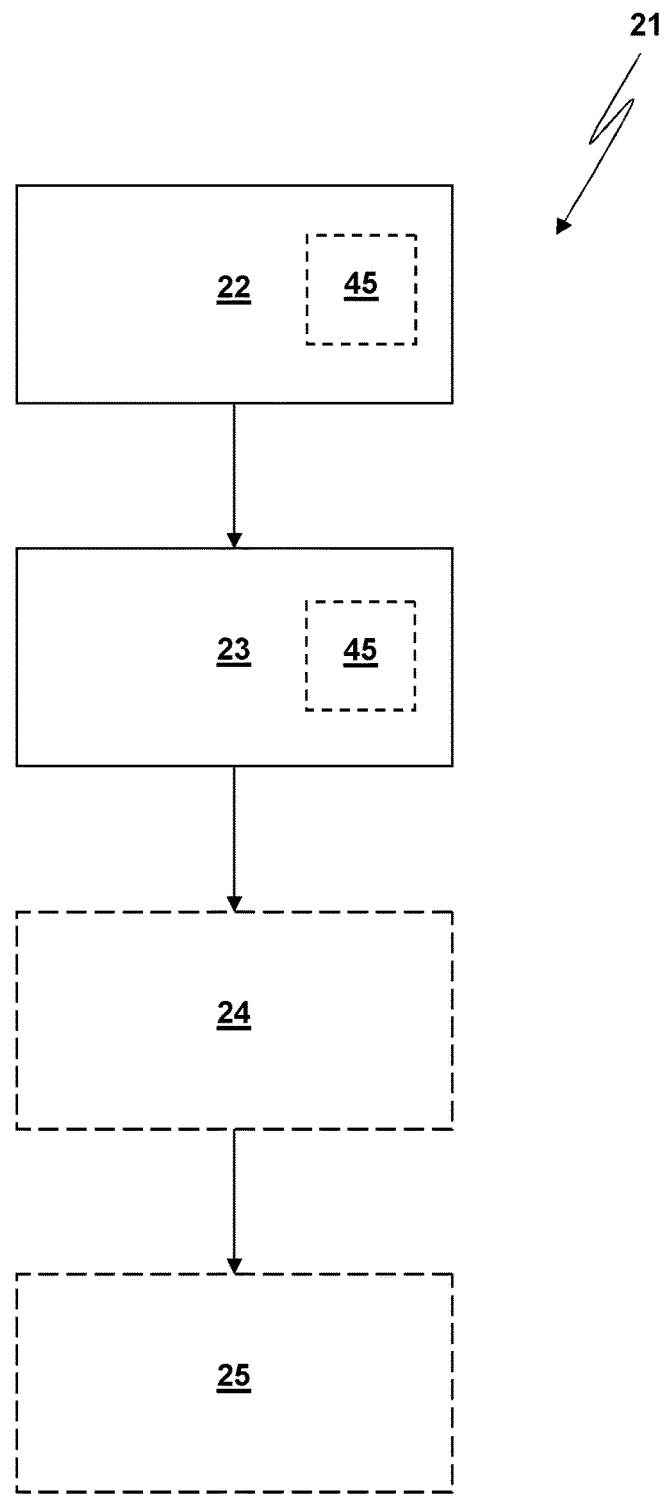
FIG. 30 shows a flowchart of a further method for packing a spacecraft membrane.

FIG. 30 shows a flowchart of the method 21 for packing the spacecraft membrane 1.

The method 21 comprises a first packing step 22 and a second packing step 23. In the first packing step 22, the spacecraft membrane 1 is packed into the transverse package 9, where this may be achieved in the way shown in FIGS. 3 to 10 by folding two mirror-symmetric zigzag foldings 8. Especially, the first packing step 22 may comprise the method 45, so that on the transverse package 9 the securing devices 30 are mounted. In any case, on the transverse package 9 the transverse corners 5 remain freely accessible.

In the second packing step 23, the transverse package 9 is packed into the longitudinal package 11, 15, 15'. This may especially be done in the way shown in FIGS. 17 and 18, so that the zigzag foldings 8 of the transverse package 9 are wound into the longitudinal package 11. It may also be done in the way shown in FIGS. 19, 20, 21, where a zigzag folding 13, 13' of the longitudinal package 15, 15' is superimposed on the zigzag foldings 8 of the transverse package 9. The longitudinal package 15 may be created with or without the bridge part 14. Optionally, the second packing step 23 may comprise the method 45, so that on the longitudinal package 12, 16, 16' the securing devices 30 are attached, independently of whether the method 45 was already done in the first packing step 22.

In a further, optional step 24, a construction element of the spacecraft, for example a mast 17, may be fed through the spacecraft membrane package 12, 16, 16', where recesses 54 may be provided in the spacecraft membrane 1 or the spacecraft membrane 1 may only comprise a recess 54 in the bottom layer 28*i*, while further layers are crushed around the mast 17.

Finally, in an optional step 25 a spacecraft membrane handling unit may be formed with the spacecraft membrane package 12, 16, 16', in that for example extendable masts are fixed to the longitudinal corners 4 and transverse corners 5.

If within the framework of the present invention corners, especially longitudinal corners 4 or transverse corners 5 are mentioned, they do not necessarily have to be angled corners. Rather than that, they may have any shape, for example may be rounded, or they may be extremities of the spacecraft membrane 1 with which the organs for unpacking the longitudinal package 11 and/or the transverse package 9 engage.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method for packing a spacecraft membrane into a spacecraft membrane package and for unpacking the spacecraft membrane package, the spacecraft membrane in a plane of extension comprising a longitudinal axis between opposite longitudinal corners and a transverse axis running transverse to the longitudinal axis and through opposite transverse corners, where packing the spacecraft membrane comprises the following steps:
a first packing step in which
the spacecraft membrane is packed into a transverse package along the transverse axis, where
material of the spacecraft membrane is packed from both sides of the longitudinal axis and where
the spacecraft membrane is packed in such a way that in the created transverse package the transverse corners are freely accessible, and
a second packing step in which
the transverse package is packed into a longitudinal package along the longitudinal axis, where
the transverse package is packed in such a way that in the created longitudinal package the longitudinal corners are freely accessible;
the transverse package being wound to the longitudinal package after folding the transverse package at a non-centrally arranged folding edge, the freely accessible longitudinal corners being arranged on opposite sides of the circumference of the winding formed by the longitudinal package; and
unpacking the spacecraft membrane comprises the following steps:
a first unpacking step in which a pulling force is exerted onto the longitudinal corners, in which way the longitudinal package is unpacked, and
a second unpacking step subsequent to the first unpacking step in which a pulling force is exerted onto the transverse corners, in which way the transverse package is unpacked.

2. A method for packing a spacecraft membrane into a spacecraft membrane package and for unpacking the spacecraft membrane package, the spacecraft membrane in a plane of extension comprising a longitudinal axis between opposite longitudinal corners and a transverse axis running transverse to the longitudinal axis and through opposite transverse corners, where packing the spacecraft membrane comprises the following steps:
a first packing step in which
the spacecraft membrane is packed into a transverse package along the transverse axis, where
material of the spacecraft membrane is packed from both sides of the longitudinal axis and where
the spacecraft membrane is packed in such a way that in the created transverse package the transverse corners are freely accessible, and
a second packing step in which
the transverse package is packed into a longitudinal package along the longitudinal axis, where
the transverse package is packed in such a way that in the created longitudinal package the longitudinal corners are freely accessible; and
unpacking the spacecraft membrane comprises the following steps:
a first unpacking step in which a pulling force is exerted onto the longitudinal corners, in which way the longitudinal package is unpacked, and
a second unpacking step subsequent to the first unpacking step in which a pulling force is exerted onto the transverse corners, in which way the transverse package is unpacked;

the spacecraft membrane comprises spring elements which lie in the region of folding edges and which bias the spacecraft membrane into an at least partially packed or at least partially unpacked state.

3. The method according to claim 1, wherein the spacecraft membrane is square.

4. The method according to claim 1, wherein the longitudinal corners and transverse corners of the spacecraft membrane are fixed to extendable masts so that the pulling force exerted onto the longitudinal corners in the first unpacking step for unpacking the longitudinal package and onto the transverse corners in the second unpacking step for unpacking the transverse package may be exerted by extending the masts.

5. A spacecraft membrane handling unit with a spacecraft membrane package with
   a spacecraft membrane which
      in a plane of extension comprises a longitudinal axis between opposite longitudinal corners and a transverse axis running transverse to the longitudinal axis and through opposite transverse corners and
      is in a packed state, in which
         material of the spacecraft membrane from both sides of the longitudinal axis is packed into a longitudinal package along the longitudinal axis, the longitudinal corners being freely accessible in the longitudinal package, and
         the longitudinal package is packed into a transverse package along the transverse axis, the transverse corners being freely accessible in the transverse package,
         the transverse package being wound to the longitudinal package afer folding the transverse package at non-centrally arranged folding edge, the freely accessible longitudinal corners being arranged on opposite sides of the circumference of the winding formed by the longitudinal package; and
   extendable masts,
      to which the longitudinal corners and transverse corners of the spacecraft membrane are affixed,
      the longitudinal corners being affixed to extendable longitudinal masts of the extendable masts and the transverse corners being affixed to extendable transverse masts of the extendable masts, and
   an extension unit for extending the masts, wherein the extension unit is configured to
      first extend the longitudinal masts so that a pulling force is exerted onto the longitudinal corners by the extending longitudinal masts and thus the longitudinal package is unpacked and
      subsequently extend the transverse masts so that a pulling force is exerted onto the transverse corners by the extending transverse masts and thus the transverse package is unpacked.

6. A method for packing a spacecraft membrane into a spacecraft membrane package and for unpacking the spacecraft membrane package, the spacecraft membrane in a plane of extension comprising a longitudinal axis between opposite longitudinal corners and a transverse axis running transverse to the longitudinal axis and through opposite transverse corners, where
   packing the spacecraft membrane comprises the following steps:
      a first packing step in which
         the spacecraft membrane is packed into a transverse package along the transverse axis, where material of the spacecraft membrane is packed from both sides of the longitudinal axis and where
         the spacecraft membrane is packed in such a way that in the created transverse package the transverse corners are freely accessible, and
      a second packing step in which
         the transverse package is packed into a longitudinal package along the longitudinal axis, where
         the transverse package is packed in such a way that in the created longitudinal package the longitudinal corners are freely accessible;
         the longitudinal package being formed by zigzag foldings in the way of an accordion on both sides of the transverse axis, the zigzag foldings extending substantially perpendicular to a plane of extension of the spacecraft membrane defined by the longitudinal axis and the transverse axis; and
   unpacking the spacecraft membrane comprises the following steps:
      a first unpacking step in which a pulling force is exerted onto the longitudinal corners, in which way the longitudinal package is unpacked, and
      a second unpacking step subsequent to the first unpacking step in which a pulling force is exerted onto the transverse corners, in which way the transverse package is unpacked.

7. The method according to claim 6, wherein the transverse package comprises zigzag foldings on both sides of the longitudinal axis.

8. The method according to claim 6, wherein the foldings each are folded from the longitudinal corner up to a bridge part of the spacecraft membrane package that is not packed.

9. The method according to claim 6, wherein the spacecraft membrane is square.

10. The method according to claim 6, wherein the longitudinal corners and transverse corners of the spacecraft membrane are fixed to extendable masts so that the pulling force exerted onto the longitudinal corners in the first unpacking step for unpacking the longitudinal package and onto the transverse corners in the second unpacking step for unpacking the transverse package may be exerted by extending the masts.

11. The method according to claim 2, wherein the spring elements only bias the transvers folds into the packed state so that by the bias of the spring elements it is possible to re-establish the transverse package but not the longitudinal package.

12. The method according to claim 2, wherein the spring elements bias the folds into the packed state and the spring elements perform a packing or restowing of the spacecraft membrane during operation of the spacecraft.

13. The method according to claim 2, wherein the transverse package comprises zigzag foldings on both sides of the longitudinal axis.

14. The method according to claim 2, wherein the spacecraft membrane is square.

15. The method according to claim 2, wherein the longitudinal corners and transverse corners of the spacecraft membrane are fixed to extendable masts so that the pulling force exerted onto the longitudinal corners in the first unpacking step for unpacking the longitudinal package and onto the transverse corners in the second unpacking step for unpacking the transverse package may be exerted by extending the masts.

16. A spacecraft membrane handling unit with a spacecraft membrane package with
   a spacecraft membrane which in a plane of extension comprises a longitudinal axis between opposite longitudinal corners and a transverse axis running transverse to the longitudinal axis and through opposite transverse corners and is in a packed state, in which material of the spacecraft membrane from both sides of the longitudinal axis is packed into a longitudinal package along the longitudinal axis, the longitudinal corners being freely accessible in the longitudinal package, and the longitudinal package is packed into a transverse package along the transverse axis, the transverse corners being freely accessible in the transverse package, the longitudinal package being formed by zigzag foldings in the way of an accordion on both sides of the transverse axis, the zigzag foldings extending substantially perpendicular to a plane of extension of the spacecraft membrane defined by the longitudinal axis and the transverse axis; and extendable masts, to which the longitudinal corners and transverse corners of the spacecraft membrane are affixed, the longitudinal corners being affixed to extendable longitudinal masts of the extendable masts and the transverse corners being affixed to extendable transverse masts of the extendable masts, and an extension unit for extending the masts, wherein the extension unit is configured to first extend the longitudinal masts so that a pulling force is exerted onto the longitudinal corners by the extending longitudinal masts and thus the longitudinal package is unpacked and subsequently extend the transverse masts so that a pulling force is exerted onto the transverse corners by the extending transverse masts and thus the transverse package is unpacked.

17. A spacecraft membrane handling unit with a spacecraft membrane package with a spacecraft membrane which in a plane of extension comprises a longitudinal axis between opposite longitudinal corners and a transverse axis running transverse to the longitudinal axis and through opposite transverse corners and is in a packed state, in which material of the spacecraft membrane from both sides of the longitudinal axis is packed into a longitudinal package along the longitudinal axis, the longitudinal corners being freely accessible in the longitudinal package, and the longitudinal package is packed into a transverse package along the transverse axis, the transverse corners being freely accessible in the transverse package, the spacecraft membrane comprising spring elements which lie in the region of folding edges and which bias the spacecraft membrane into an at least partially packed or at least partially unpacked state; and extendable masts, to which the longitudinal corners and transverse corners of the spacecraft membrane are affixed, the longitudinal corners being affixed to extendable longitudinal masts of the extendable masts and the transverse corners being affixed to extendable transverse masts of the extendable masts, and an extension unit for extending the masts, wherein the extension unit is configured to first extend the longitudinal masts so that a pulling force is exerted onto the longitudinal corners by the extending longitudinal masts and thus the longitudinal package is unpacked and subsequently extend the transverse masts so that a pulling force is exerted onto the transverse corners by the extending transverse masts and thus the transverse package is unpacked.

* * * * *